US010172031B2

(12) United States Patent
Xie et al.

(10) Patent No.: US 10,172,031 B2
(45) Date of Patent: Jan. 1, 2019

(54) WIRELESS ASSISTANCE METHOD, APPARATUS AND SYSTEM

(71) Applicant: Huawei Technologies Co., Ltd., Shenzhen (CN)

(72) Inventors: Yong Xie, Chengdu (CN); Lu Rong, Shanghai (CN); Jun Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 54 days.

(21) Appl. No.: 15/332,147

(22) Filed: Oct. 24, 2016

(65) Prior Publication Data
US 2017/0041823 A1 Feb. 9, 2017

Related U.S. Application Data

(63) Continuation of application No. PCT/CN2015/076979, filed on Apr. 20, 2015.

(30) Foreign Application Priority Data

Apr. 24, 2014 (CN) .......................... 2014 1 0169876

(51) Int. Cl.
*H04W 28/02* (2009.01)
*H04L 12/28* (2006.01)
(Continued)

(52) U.S. Cl.
CPC ......... *H04W 28/0247* (2013.01); *H04L 12/28* (2013.01); *H04W 16/00* (2013.01);
(Continued)

(58) Field of Classification Search
CPC ................................................. H04W 28/0284
See application file for complete search history.

(56) References Cited

U.S. PATENT DOCUMENTS 7,558,567 B2 * 7/2009 Garg ...................... H04L 41/00
455/11.1
2007/0047493 A1 * 3/2007 Park .................. H04W 36/0055
370/331
(Continued)

FOREIGN PATENT DOCUMENTS

CN 1830177 A 9/2006
CN 101223797 A 7/2008
(Continued)

*Primary Examiner* — Ayanah S George
(74) *Attorney, Agent, or Firm* — Slater Matsil, LLP

(57) ABSTRACT

This application discloses a wireless assistance method, apparatus, and system. The wireless assistance apparatus includes an obtaining module, a determining module, and a transmission module. The obtaining module is configured to obtain network status information, and the obtaining module transmits the network status information to the determining module. The determining module is configured to receive the network status information, and determine, according to the network status information, a mobile access point that needs to perform wireless assistance, and the determining module transmits information about the mobile access point to the transmission module. The transmission module is configured to receive the information about the mobile access point, and transmit assistance command information to the mobile access point, where the assistance command information is information for instructing the mobile access point to perform wireless assistance.

20 Claims, 8 Drawing Sheets

(51) Int. Cl.
*H04W 72/04* (2009.01)
*H04W 16/00* (2009.01)
*H04W 28/08* (2009.01)
*H04W 64/00* (2009.01)

(52) U.S. Cl.
CPC ........... *H04W 28/08* (2013.01); *H04W 64/00* (2013.01); *H04W 72/0433* (2013.01); *H04W 28/0226* (2013.01); *H04W 72/0486* (2013.01)

(56) References Cited

U.S. PATENT DOCUMENTS

| | | | |
|---|---|---|---|
| 2012/0005285 A1* | 1/2012 | Lin | H04W 4/90 709/206 |
| 2012/0257598 A1* | 10/2012 | Karampatsis | H04W 8/082 370/331 |
| 2015/0023341 A1 | 1/2015 | Zhao et al. | |

FOREIGN PATENT DOCUMENTS

| | | |
|---|---|---|
| CN | 102647771 A | 8/2012 |
| CN | 103476004 A | 12/2013 |
| WO | 2006066007 A1 | 6/2006 |

\* cited by examiner

WIRELESS ASSISTANCE METHOD, APPARATUS AND SYSTEM

CROSS-REFERENCE TO RELATED APPLICATIONS

This application is a continuation of International Application No. PCT/CN2015/076979, filed on Apr. 20, 2015, which claims priority to Chinese Patent Application No. 201410169876.9, filed on Apr. 24, 2014. The disclosures of the aforementioned applications are hereby incorporated by reference in their entireties.

TECHNICAL FIELD

This application relates to the communications field, and in particular, to a wireless assistance method, apparatus, and system.

BACKGROUND

With development of wireless communications technologies, people have higher requirements on wireless communication, and people spend more time in viewing videos by using a wireless network anywhere at anytime. Due to uneven distribution of geographic locations of people using a wireless communications network, wireless communication requirements are also unevenly distributed. However, limited by factors of bandwidth, resources, a data transmission rate, and the like, a conventional cellular network can hardly meet requirements of people.

In view of uneven distribution features of wireless communications network requirements, the prior art provides a plurality of hotspot coverage technologies, for example, wireless fidelity (WiFi) in Institute of Electrical and Electronics Engineers (IEEE) standards and heterogeneous network (HetNet) in 3rd Generation Partnership Project (3GPP) standards. Featuring flexible configuration, high mobility, fast data transmission, and the like, the hotspot coverage technologies can meet wireless communications network requirements in a hotspot area.

However, in all the conventional hotspot coverage technologies, it is still assumed that distribution of wireless communication requirements keeps unchanged, and therefore, a fixed wireless access site is assumed. Actually, as people are moving and activities of individuals are changing, distribution of geographic locations of requirements, tasks currently performed by a wireless communications network (for example, viewing a video, and browsing web pages), and the like all change over time. In addition, in many scenarios, this change over time is quite obvious. Consequently, the wireless access site can hardly be determined according to requirements of people, and the wireless access site can hardly be optimized. For example, when a hotspot coverage area, such as a venue for holding a concert, is crowded with people, because a quantity of access users, requested bandwidth, and data traffic increase sharply, a current wireless access site is overloaded, and can hardly meet user requirements within coverage of the wireless access site, and consequently, users are unable to successfully access a wireless network; however, when there are few people, the wireless access site may be in an idle state, resulting in resource waste.

SUMMARY

This application provides a wireless assistance method, apparatus, and system, which can mitigate wireless access load of an access device that requires assistance, enhance network performance, and improve a wireless access service provided by a wireless network for a user.

A first aspect of this application provides a wireless assistance apparatus, where the apparatus includes an obtaining module, a determining module, and a transmission module. The obtaining module is configured to obtain network status information. Additionally, the determining module is configured to determine, according to the network status information obtained by the obtaining module, a mobile access point that needs to perform wireless assistance. Also, the transmission module is configured to transmit assistance command information to the mobile access point determined by the determining module, where the assistance command information is information for instructing the mobile access point to perform wireless assistance.

With reference to the first aspect, in a first possible implementation manner of the first aspect of this application, the network status information is specifically one or a combination of the following: a user quantity, requested bandwidth, data traffic, or a service requirement.

With reference to the first aspect or the first possible implementation manner of the first aspect, in a second possible implementation manner of the first aspect of this application, the network status information further includes assistance status information, where the assistance status information is one or a combination of a location parameter, a time parameter, or an event identifier of the mobile access point that is performing wireless assistance.

With reference to any one of the first aspect, or the first or the second possible implementation manner of the first aspect, in a third possible implementation manner of the first aspect of this application, the transmission module is further configured to transmit assistance request information to at least one mobile access point, where the assistance request information includes information about a location at which wireless assistance is required; the obtaining module is further configured to receive assistance response information transmitted by the at least one mobile access point, where the assistance response information includes a mobile access point identifier, where the mobile access point identifier represents a mobile access point that can perform wireless assistance; and the determining module is further configured to determine, according to the assistance response information obtained by the obtaining module, from the at least one mobile access point, the mobile access point that needs to perform wireless assistance.

With reference to the third possible implementation manner of the first aspect, in a fourth possible implementation manner of the first aspect of this application, the assistance response information further includes one or a combination of the following: a device capability parameter, an operating status parameter, a time parameter, an effectiveness parameter, or an assistance request information sequence number.

With reference to the third or the fourth possible implementation manner of the first aspect, in a fifth possible implementation manner of the first aspect of this application, the assistance request information further includes one or a combination of the following: a device capability parameter, a time parameter, an effectiveness parameter, or a device name.

With reference to any one of the third to the fifth possible implementation manners of the first aspect, in a sixth possible implementation manner of the first aspect of this application, the assistance command information further includes one or a combination of the following: a mobile access point identifier, a device name, or an assistance request information sequence number.

A second aspect of this application provides a wireless assistance apparatus, where the wireless assistance apparatus includes a processor and a transmitter. The processor is configured to obtain network status information, and determine, according to the network status information, a mobile access point that needs to perform wireless assistance. Additionally, the transmitter is configured to transmit assistance command information to the mobile access point determined by the processor, where the assistance command information is information for instructing the mobile access point to perform wireless assistance.

With reference to the second aspect, in a first possible implementation manner of the second aspect of this application, the network status information is specifically one or a combination of the following: a user quantity, requested bandwidth, data traffic, or a service requirement.

With reference to the second aspect or the first possible implementation manner of the second aspect, in a second possible implementation manner of the second aspect of this application, the network status information further includes assistance status information, where the assistance status information is one or a combination of a location parameter, a time parameter, or an event identifier of the mobile access point that is performing wireless assistance.

With reference to any one of the second aspect, or the first or the second possible implementation manner of the second aspect, in a third possible implementation manner of the second aspect of this application, the apparatus further includes a receiver, where the transmitter is further configured to transmit assistance request information to at least one mobile access point, where the assistance request information includes information about a location at which wireless assistance is required; the receiver is configured to receive assistance response information transmitted by the at least one mobile access point, where the assistance response information includes a mobile access point identifier, where the mobile access point identifier represents a mobile access point that can perform wireless assistance; and the processor is further configured to determine, according to the assistance response information received by the receiver, from the at least one mobile access point, the mobile access point that needs to perform wireless assistance.

With reference to the third possible implementation manner of the second aspect, in a fourth possible implementation manner of the second aspect of this application, the assistance response information further includes one or a combination of the following: a device capability parameter, an operating status parameter, a time parameter, an effectiveness parameter, or an assistance request information sequence number.

With reference to the third or the fourth possible implementation manner of the second aspect, in a fifth possible implementation manner of the second aspect of this application, the assistance request information further includes one or a combination of the following: a device capability parameter, a time parameter, an effectiveness parameter, or a device name.

With reference to any one of the third to the fifth possible implementation manners of the second aspect, in a sixth possible implementation manner of the second aspect of this application, the assistance command information further includes one or a combination of the following: a mobile access point identifier, a device name, or an assistance request information sequence number.

A third aspect of this application provides a mobile access point, where the mobile access point includes a receiving module and a processing module, where the receiving module is configured to receive assistance command information transmitted by a network node; and the processing module is configured to perform wireless assistance according to the assistance command information received by the receiving module.

With reference to the third aspect, in a first possible implementation manner of the third aspect of this application, the mobile access point further includes: a transmission module, configured to transmit assistance status information to the network node, where the assistance status information includes one or a combination of a location parameter, a time parameter, or an event identifier.

With reference to the third aspect or the first possible implementation manner of the third aspect, in a second possible implementation manner of the third aspect of this application, the receiving module is further configured to receive assistance request information transmitted by the network node, where the assistance request information includes information about a location at which wireless assistance is required; the processing module is further configured to determine, according to the assistance request information received by the receiving module, whether wireless assistance can be performed; and when wireless assistance can be performed, the transmission module is further configured to transmit assistance response information to the network node, where the assistance response information includes a mobile access point identifier.

With reference to the second possible implementation manner of the third aspect, in a third possible implementation manner of the third aspect of this application, the assistance request information further includes one or a combination of the following: a device capability parameter, a time parameter, an effectiveness parameter, or a device name.

With reference to the second or the third possible implementation manner of the third aspect, in a fourth possible implementation manner of the third aspect of this application, the assistance response information further includes one or a combination of the following: a device capability parameter, an operating status parameter, a time parameter, an effectiveness parameter, or an assistance request information sequence number.

With reference to any one of the second to the fourth possible implementation manners of the third aspect, in a fifth possible implementation manner of the third aspect of this application, the assistance command information further includes one or a combination of the following: a mobile access point identifier, a device name, or an assistance request information sequence number.

A fourth aspect of this application provides a mobile access point, where the mobile access point includes a receiver and a processor, where the receiver is configured to receive assistance command information transmitted by a network node; and the processor is configured to perform wireless assistance according to the assistance command information received by the receiver.

With reference to the fourth aspect, in a first possible implementation manner of the fourth aspect of this application, the mobile access point further includes a transmitter, configured to transmit assistance status information to the network node, where the assistance status information includes one or a combination of a location parameter, a time parameter, or an event identifier.

With reference to the fourth aspect or the first possible implementation manner of the fourth aspect, in a second possible implementation manner of the fourth aspect of this application, the receiver is further configured to receive assistance request information transmitted by the network node, where the assistance request information includes information about a location at which wireless assistance is required; the processor is further configured to determine, according to the assistance request information received by the receiver, whether wireless assistance can be performed; and when wireless assistance can be performed, the transmitter is further configured to transmit assistance response information to the network node, where the assistance response information includes a mobile access point identifier.

With reference to the second possible implementation manner of the fourth aspect, in a third possible implementation manner of the fourth aspect of this application, the assistance request information further includes one or a combination of the following: a device capability parameter, a time parameter, an effectiveness parameter, or a device name.

With reference to the second or the third possible implementation manner of the fourth aspect, in a fourth possible implementation manner of the fourth aspect of this application, the assistance response information further includes one or a combination of the following: a device capability parameter, an operating status parameter, a time parameter, an effectiveness parameter, or an assistance request information sequence number.

With reference to any one of the second to the fourth possible implementation manners of the fourth aspect, in a fifth possible implementation manner of the fourth aspect of this application, the assistance command information further includes one or a combination of the following: a mobile access point identifier, a device name, or an assistance request information sequence number.

A fifth aspect of this application provides a wireless assistance method, where the method includes: obtaining network status information; determining, according to the network status information, a mobile access point that needs to perform wireless assistance; and transmitting assistance command information to the mobile access point, where the assistance command information is information for instructing the mobile access point to perform wireless assistance.

With reference to the fifth aspect, in a first possible implementation manner of the fifth aspect of this application, the network status information is specifically one or a combination of the following: a user quantity, requested bandwidth, data traffic, or a service requirement.

With reference to the fifth aspect or the first possible implementation manner of the fifth aspect, in a second possible implementation manner of the fifth aspect of this application, the network status information further includes assistance status information, where the assistance status information is one or a combination of a location parameter, a time parameter, or an event identifier of the mobile access point that performs wireless assistance.

With reference to any one of the fifth aspect, or the first or the second possible implementation manner of the fifth aspect, in a third possible implementation manner of the fifth aspect of this application, the determining, according to the network status information, a mobile access point that needs to perform wireless assistance, is specifically: transmitting assistance request information to at least one mobile access point, where the assistance request information includes information about a location at which wireless assistance is required; receiving assistance response information transmitted by the at least one mobile access point, where the assistance response information includes a mobile access point identifier, where the mobile access point identifier represents a mobile access point that can perform wireless assistance; and determining, according to the assistance response information, from the at least one mobile access point, the mobile access point that needs to perform wireless assistance.

With reference to the third possible implementation manner of the fifth aspect, in a fourth possible implementation manner of the fifth aspect of this application, the assistance request information further includes one or a combination of the following: a device capability parameter, a time parameter, an effectiveness parameter, or a device name.

With reference to the third or the fourth possible implementation manner of the fifth aspect, in a fifth possible implementation manner of the fifth aspect of this application, the assistance response information further includes one or a combination of the following: a device capability parameter, an operating status parameter, a time parameter, an effectiveness parameter, or an assistance request information sequence number.

With reference to any one of the third to the fifth possible implementation manners of the fifth aspect, in a sixth possible implementation manner of the fifth aspect of this application, the assistance command information further includes one or a combination of the following: a mobile access point identifier, a device name, or an assistance request information sequence number.

A sixth aspect of this application provides a wireless assistance method, where the method includes: receiving assistance command information transmitted by a network node; and performing wireless assistance according to the assistance command information.

With reference to the sixth aspect, in a first possible implementation manner of the sixth aspect of this application, the method further includes: when performing wireless assistance, transmitting assistance status information to the network node, where the assistance status information includes one or a combination of a location parameter, a time parameter, or an event identifier.

With reference to the sixth aspect or the first possible implementation manner of the sixth aspect, in a second possible implementation manner of the sixth aspect of this application, before the receiving assistance command information transmitted by a network node, the method further includes: receiving assistance request information transmitted by the network node, where the assistance request information includes information about a location at which wireless assistance is required; determining, according to the assistance request information, whether wireless assistance can be performed; and when wireless assistance can be performed, transmitting assistance response information to the network node, where the assistance response information includes a mobile access point identifier.

With reference to the second possible implementation manner of the sixth aspect, in a third possible implementation manner of the sixth aspect of this application, the assistance request information further includes one or a combination of the following: a device capability parameter, a time parameter, an effectiveness parameter, or a device name.

With reference to the second or the third possible implementation manner of the sixth aspect, in a fourth possible implementation manner of the sixth aspect of this application, the assistance response information further includes one or a combination of the following: a device capability parameter, an operating status parameter, a time parameter, an effectiveness parameter, or an assistance request information sequence number.

With reference to any one of the second to the fourth possible implementation manners of the sixth aspect, in a fifth possible implementation manner of the sixth aspect of this application, the assistance command information further includes one or a combination of the following: a mobile access point identifier, a device name, or an assistance request information sequence number.

A seventh aspect of this application provides a wireless assistance system, including a wireless assistance apparatus and a mobile access point, where the wireless assistance apparatus can communicate with the mobile access point, where the wireless assistance apparatus is user equipment, an access device, or a control device, and the wireless assistance apparatus is the wireless assistance apparatus mentioned above.

With reference to the sixth aspect, in a first possible implementation manner of the sixth aspect of this application, the mobile access point is the mobile access point mentioned above.

In the foregoing solutions, a mobile access point receives a wireless assistance request transmitted by a network node, and moves, according to the wireless assistance request, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

When at least two mobile access points in the network can provide wireless assistance for the access device that requires assistance, the network node may further select a most suitable mobile access point from the mobile access points to provide wireless assistance. In addition, a time required by the mobile access point to arrive at the location at which wireless assistance needs to be provided can be estimated more accurately according to an assistance status report transmitted by the mobile access point, and therefore, the mobile access point that can provide wireless assistance is dynamically adjusted to provide wireless assistance.

DETAILED DESCRIPTION OF ILLUSTRATIVE EMBODIMENTS

In the following description, to illustrate rather than limit, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

Figure 1:
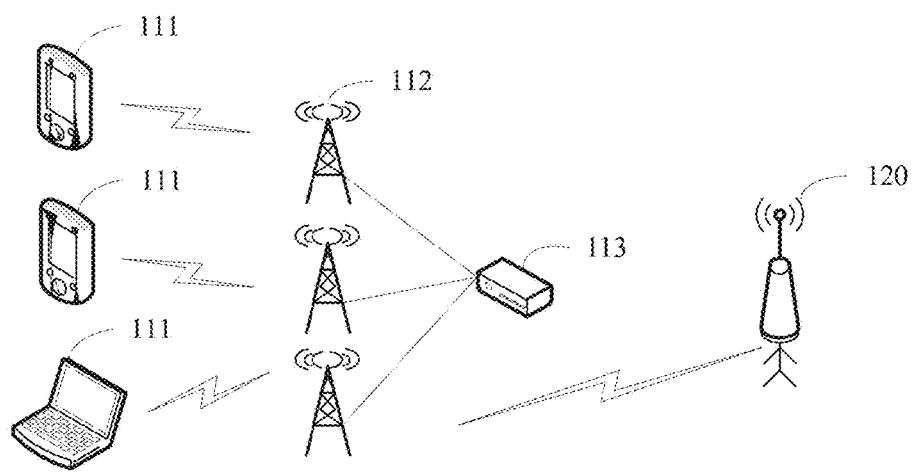
FIG. 1 is a schematic structural diagram of an implementation manner of a wireless assistance system according to this application.

Referring to FIG. 1, FIG. 1 is a schematic structural diagram of an implementation manner of a wireless assistance system according to this application. The wireless assistance system in this implementation manner includes user equipment 111, an access device 112, a control device 113, and a mobile access point 120. The user equipment 111 is connected to the access device 112 in a wireless manner, the access device 112 can communicate with the control device 113, and the mobile access point 120 may move randomly. When the access device 112 requires assistance, the mobile access point 120 may move to a location at which wireless assistance can be provided for the access device 112 requiring wireless assistance, and may perform wireless communication with the control device 113, the user equipment in within coverage, and the access device 112 within the coverage to provide a wireless traffic offload service for the access device 112 within the coverage.

A network node obtains network status information, and determines, according to the obtained network status information, whether an access device 112 that requires the mobile access point 120 to provide wireless assistance exists in a network. The network node is the user equipment in, the access device 112, or the control device 113. The network status information is specifically one or a combination of the following: a user quantity, requested bandwidth, data traffic, or a service requirement. Wireless assistance means that the mobile access point 120 provides a wireless traffic offload service in a wireless manner for the access device 112 that requires assistance.

When the network node is the user equipment 111, a user transmits, by using the user equipment in, wireless access request information to an access device 112 in an area in which the user equipment 111 is located, so as to obtain a wireless access service provided by the access device 112.

The user equipment in collects wireless service requirement information at an interval of a first preset time, and determines, according to the collected wireless service requirement information, information about whether a wireless service requirement can be met properly, and therefore determines whether the accessed access device 112 requires assistance, and further determines whether an access device that requires the mobile access point 120 to provide wireless assistance exists in the network. The user equipment 111 is generally a mobile terminal, and may be a mobile phone, or may be a notebook computer.

When the network node is the access device 112, the access device 112 collects information about a user quantity, requested bandwidth, data traffic, and whether a user service requirement can be met in time in the access device 112, and determines, according to the collected information, whether the access device 112 itself can meet a user requirement within coverage, and further determines whether an access device that requires the mobile access point 120 to provide wireless assistance exists in the network. The access device 112 may be a fixed wireless access point, or may be a mobile access point 120.

When the network node is the control device 113, the control device 113 collects information about a user quantity, requested bandwidth, data traffic, and whether a user service requirement can be met in time in a plurality of access devices 112 in the access network, and determines, according to the collected information, whether each access device 112 can meet a user requirement within coverage, and further determines whether an access device that requires the mobile access point 120 to provide wireless assistance exists in the network.

When the network node determines that an access device 112 that requires the mobile access point 120 to provide wireless assistance exists in the network, the network node determines the mobile access point 120 that needs to perform wireless assistance. A quantity of mobile access points 120 in the network may be one or may be at least two.

When the network node determines the mobile access point 120 that needs to perform wireless assistance, the network node transmits, in broadcast mode, assistance command information to the mobile access point 120 that needs to perform wireless assistance in the network. The assistance command information is information for instructing the mobile access point 120 to perform wireless assistance, and the assistance command information includes at least a message identifier and a location identifier, where the location identifier is a device identifier or a location parameter. The message identifier is used to indicate that the information is assistance command information, so that the mobile access point 120 can determine, according to the message identifier, that the access device 112 that requires the mobile access point 120 to provide wireless assistance exists in the network. The location identifier is used to indicate a location of the access device 112 that requires the mobile access point 120 to provide wireless assistance, so that the mobile access point 120 can identify, according to the location identifier, the location of the access device 112 that requires the mobile access point 120 to provide wireless assistance.

It may be understood that, in this implementation manner, when the network node determines that the access device 112 that requires the mobile access point 120 to provide wireless assistance exists in the network, and determines the mobile access point that needs to perform wireless assistance, the network node transmits the assistance command information to all mobile access points 120 in the network in broadcast mode, so as to transmit the assistance command information to the mobile access point 120 that needs to perform wireless assistance.

In other implementation manners, the network node may also select, according to a quantity of mobile access points that need to perform wireless assistance and are determined by the network node, any one of a unicast mode, a multicast mode, or a broadcast mode to transmit the assistance command information to the mobile access points 120 that need to perform wireless assistance. For example, when it is determined that one or two mobile access points 120 need to perform wireless assistance, the network node transmits, in unicast mode, the assistance command information to the mobile access points 120 that need to perform wireless assistance. When it is determined that three mobile access points 120 need to perform wireless assistance, the network node transmits, in multicast mode, the assistance command information to the mobile access points 120 that need to perform wireless assistance. When it is determined that at least four mobile access points 120 need to perform wireless assistance, the network node transmits the assistance command information to all mobile access points 120 in broadcast mode.

After receiving the assistance command information, the mobile access point 120 determines, according to the message identifier in the assistance command information, that the network node allows the mobile access point to provide wireless assistance, and identifies, according to the location identifier in the assistance command information, the location of the access device 112 that requires the mobile access point 120 to provide wireless assistance. The location identifier is a device identifier or a location parameter. When the location identifier is a device identifier, the access device 112 that requires assistance is identified according to the device identifier, so that the location of the access device 112 is found. When the location identifier is a location parameter, a target location at which the mobile access point 120 needs to provide wireless assistance is identified according to the location parameter.

A method for obtaining the location of the access device 112 by the mobile access point 120 may be obtaining the location by querying a locally stored table of mappings between device identifiers and locations. When the device identifier is not stored locally, information may also be transmitted to a node (for example, an access controller or a server) that provides a location query service in the network, so that location information corresponding to the device identifier is queried; in addition, the device identifier and the location information corresponding to the device identifier are stored in the local table of mappings between device identifiers and locations, so that the mobile access point 120 can perform a query locally.

After the mobile access point 120 obtains the location of the access device 112 that requires assistance, the mobile access point 120 moves to the target location, and moves to the location at which wireless assistance can be provided for the access device 112 that requires assistance. Therefore, a wireless traffic offload service is provided in a wireless manner for the access device 112 that requires assistance.

Optionally, when the network node determines the mobile access point 120 that needs to perform wireless assistance, the network node may further transmit assistance request information to at least one mobile access point 120. The assistance request information includes information about a location at which wireless assistance is required, so that the mobile access point 120 can determine, according to the information about the location at which wireless assistance is required, whether the mobile access point 120 can move to the location at which wireless assistance is required. It may be understood that, in this implementation manner, when the network node determines that the access device 112 that requires the mobile access point 120 to provide wireless assistance exists in the network, the network node transmits the assistance request information to the mobile access point 120 in broadcast mode. In other implementation manners, the network node may also select any one of the unicast mode, the multicast mode, or the broadcast mode according to a specific situation to transmit the assistance request information to the mobile access point 120. For example, when the network node does not know the quantity of mobile access points in the network, the network node uses the broadcast mode to transmit the assistance request information to all mobile access points 120 in the network; when the network node obtains the quantity of mobile access points 120 in the network, the network node uses different modes according to the quantity of mobile access points 120 to transmit the assistance request information to the mobile access points 120, so as to save transmission resources. For example, when there are only one or two mobile access points 120 in the network, the network node transmits the assistance request information to the mobile access points 120 in unicast mode. When there are three mobile access points 120 in the network, the network node transmits assistance request information to the mobile access points 120 in multicast mode. When there are at least four mobile access points 120 in the network, the network node transmits the assistance request information to the mobile access points 120 in broadcast mode. The network node may query the quantity of mobile access points 120 in the network by broadcast, or may determine the quantity of mobile access points 120 according to information transmitted by the mobile access points 120 in advance, where the specific method is not limited.

It may be understood that, the assistance request information further includes one or a combination of the following: a device capability parameter, a time parameter, an effectiveness parameter, or a device name.

The device capability parameter is used to indicate a capability requirement (for example, hardware configurations supported by the network node such as an access mode, access bandwidth, a backhaul mode, a backhaul rate, a battery standby time, and a chip processing speed, and supported software configurations such as functions) that the mobile access point 120 that provides wireless assistance needs to meet. Only a mobile access point 120 that meets the device capability parameter is qualified to provide wireless assistance for the access device 112 that requires assistance.

The time parameter is used to indicate a start time and an end time at which wireless assistance needs to be provided for the access device 112. A difference between the end time and the start time is a valid time, so that the mobile access point 120 can estimate, according to the time parameter, a response time required for arriving at the location at which wireless assistance needs to be provided, and a valid time within which wireless assistance needs to be provided, and therefore can determine, according to the response time, whether the mobile access point 120 can move, within the valid time within which wireless assistance needs to be provided, to the location at which wireless assistance can be provided for the access device 112 that requires assistance. When the response time is longer than the valid time, the mobile access point 120 does not provide wireless assistance.

The effectiveness parameter is a priority parameter or an assistance effectiveness parameter. The priority parameter is used to indicate a priority of an assistance request, so that the mobile access point 120 can determine, according to the priority of the assistance request, a sequence of responding to the assistance request corresponding to the priority. The assistance effectiveness parameter is used to indicate an assistance effectiveness indicator of the assistance request. The assistance effectiveness indicator is a parameter for measuring network performance enhanced by the mobile access point, for example, a largest capacity, a moving speed, and a delay of the mobile access point. The mobile access point 120 can further determine the assistance effectiveness indicator of the assistance request according to the assistance effectiveness indicator. Wireless assistance is provided only when the mobile access point 120 determines that the assistance effectiveness indicator of the assistance request is higher than an assistance effectiveness indicator of a currently provided wireless access service.

The device name is a network identifier or a service set identifier. The network identifier is used to indicate a network identifier that should be used when the mobile access point 120 that provides wireless assistance for the access device 112 provides a wireless service, for example, a WiFi network; the service set identifier is used to indicate a service set identifier that should be used when the mobile access point 120 that provides wireless assistance for the access device 112 provides a wireless service for the access device 112, for example, CMCC.

The quantity of mobile access points 120 in the network may be one or may be at least two.

It may be understood that, when the at least one mobile access point 120 receives the assistance request information transmitted by the network node, the mobile access point 120 determines, according to a message identifier in the assistance request information, whether the access device 112 that requires the mobile access point 120 to provide wireless assistance exists in the network, identifies, according to a location parameter in the assistance request information, the device identifier of the access device 112 that requires the mobile access point to provide wireless assistance, and determines the location of the access device 112 according to the device identifier of the access device 112.

After the mobile access point 120 determines the location of the access device 112 that needs to be provided with wireless assistance, the mobile access point 120 determines, according to parameters such as the location of the access device 112 that needs to be provided with wireless assistance, a current moving speed, and a moving path, whether the mobile access point 120 can move, within the valid time within which wireless assistance needs to be provided, to the location at which wireless assistance can be provided for the access device 112 that requires assistance, to perform wireless assistance.

When the mobile access point 120 determines that the mobile access point 120 can move, within the valid time within which wireless assistance needs to be provided, to the location at which wireless assistance can be provided for the access device 112 that requires assistance, to perform wireless assistance, the mobile access point 120 transmits assistance response information to the access device 112 that requires assistance. The assistance response information includes at least a mobile access point identifier, so that the network node can identify, according to the mobile access point identifier in the assistance response information, the mobile access point 120 that can provide wireless assistance.

It may be understood that, the assistance response information transmitted by the mobile access point 120 that can provide wireless assistance further includes one or a combination of the following: a device capability parameter, an operating status parameter, a time parameter, an effectiveness parameter, or an assistance request information sequence number, so that the network node can determine, according to the received assistance response information, from the at least one mobile access point 120 that can provide wireless assistance, the mobile access point that needs to perform wireless assistance. An operating status includes being idle, moving to the location at which wireless assistance needs to be provided, and providing a wireless traffic offload service; the effectiveness parameter is a priority parameter or an assistance effectiveness parameter.

The device capability parameter is used to indicate a capability of the mobile access point 120 (for example, hardware configurations supported by the mobile access point 120 such as an access mode, access bandwidth, a backhaul mode, a backhaul rate, a battery standby time, and a chip processing speed, and supported software configurations such as functions), so that the network node can select, according to the device capability parameter, from the mobile access points 120 that can provide wireless assistance, a mobile access point 120 that can better meet the capability requirement of the access device 112 that requires assistance, to provide wireless assistance.

The operating status parameter is used to indicate a current operating status of the mobile access point 120, so that the network node can preferentially select, according to the current operating status of the mobile access point 120, a mobile access point 120 that is in an idle state, to provide wireless assistance.

The time parameter is used to indicate the time required by the mobile access point 120 to arrive at the location at which wireless assistance needs to be provided, to provide a wireless traffic offload service, so that the network node can compare the time parameter with the valid time within which wireless assistance needs to be provided for the access device 112, so as to select, from the mobile access points 120 that can provide wireless assistance, a mobile access point 120 that can more quickly arrive at the location at which wireless assistance needs to be provided, to provide wireless assistance.

When the effectiveness parameter is a priority parameter, the network node can identify, according to the priority parameter, a priority of wireless assistance currently provided by the mobile access point 120, or identify a difference between a priority of wireless assistance currently provided by the mobile access point 120 and a priority indicated in the assistance request information, and therefore can select, from the mobile access points 120 that can provide wireless assistance, a mobile access point 120 that can preferentially respond to the assistance request information, to provide wireless assistance.

When the effectiveness parameter is an assistance effectiveness parameter, the network node can identify, according to the assistance effectiveness parameter, an assistance effectiveness indicator of wireless assistance currently provided by the mobile access point 120, or identify a difference between an assistance effectiveness indicator of wireless assistance currently provided by the mobile access point 120 and an assistance effectiveness indicator indicated in the assistance request information. The assistance effectiveness indicator is a parameter for measuring network performance enhanced by the mobile access point, for example, a largest capacity, a moving speed, and a delay of the mobile access point 120, and therefore can select, from the mobile access points 120 that can provide wireless assistance, a mobile access point 120 that has highest assistance effectiveness to provide wireless assistance.

The assistance request information sequence number is used to indicate a priority of an assistance request corresponding to the assistance response information, so that the network node can further identify, according to the assistance request information sequence number, the priority of the assistance request corresponding to the assistance response information, and therefore can select a mobile access point 120 with a high priority to provide wireless assistance.

When the network node receives the assistance response information transmitted by the at least one mobile access point, the network node determines, according to a message identifier in the assistance response information, that a mobile access point 120 can provide wireless assistance, and identifies, according to the mobile access point identifier in the assistance response information, the mobile access point 120 that can provide wireless assistance. The network node determines, according to parameters in the assistance response information transmitted by each mobile access point 120, from the at least one mobile access point 120, a mobile access point 120 that needs to perform wireless assistance. A quantity of mobile access points 120 that need to perform wireless assistance is decided according to a specific situation of network status information. For example, the quantity is decided according to a user quantity, requested bandwidth, data traffic, or a service requirement.

The network node determines, from the at least one mobile access point 120 that can provide wireless assistance, the mobile access point 120 that needs to perform wireless assistance. A followed principle may be: preferentially selecting a mobile access point 120 currently in an idle state to provide wireless assistance, and when there are multiple mobile access points 120 currently in idle states, selecting, according to the capability parameter of each mobile access point 120, the priority parameter or assistance effectiveness parameter of the currently provided service, and the priority parameter or assistance effectiveness parameter of the wireless assistance, a mobile access point 120 that provides wireless assistance and can better meet the capability requirement of the access device 112 requiring assistance and can more quickly arrive at the location at which wireless assistance needs to be provided, to provide wireless assistance. In other implementation manners, other selection principles may be followed, which is decided according to an actual situation.

After the network node determines that the mobile access point 120 that needs to perform wireless assistance provides wireless assistance for the access device 112, the network node transmits the assistance command information to the selected mobile access point 120.

Optionally, the assistance command information transmitted by the network node to the selected mobile access point 120 further includes one or a combination of the following: a mobile access point identifier, a device name, or an assistance request information sequence number, where the device name is a network identifier or a service set identifier.

The mobile access point identifier is used to indicate the mobile access point 120 that needs to perform wireless assistance, so that the selected mobile access point 120 can determine, according to the mobile access point identifier in the assistance command information, whether the mobile access point 120 is the selected mobile access point, and when a determining result is yes, move to the location at which wireless assistance can be provided for the access device that requires assistance, to provide a wireless traffic offload service, or otherwise, consider that incorrect assistance command information is received and perform no processing.

The device name is used to indicate a device name that should be used by the mobile access point 120 that needs to perform wireless assistance, when the mobile access point 120 provides a wireless service. Therefore, the device name used when the mobile access point 120 provides the wireless service keeps consistent with a device name used by the access device 112 that requires assistance, and a wireless traffic offload service can be provided for the access device 112. When the device name is a network identifier, the selected mobile access point 120 can identify, according to the network identifier in the assistance command information, a network identifier (for example, a WiFi network) that should be used when the mobile access point 120 provides a wireless service. Therefore, the network identifier used when the mobile access point 120 provides the wireless service keeps consistent with a network identifier used by the access device 112 that requires assistance, and a wireless traffic offload service can be provided for the access device 112.

When the device name is a service set identifier, the selected mobile access point 120 can identify, according to the service set identifier, a service set identifier (for example, conference and media control client (CMCC)) that should be used when the mobile access point 120 provides a wireless service. Therefore, the service set identifier used when the mobile access point 120 provides the wireless service keeps consistent with a service set identifier used by the access device 112 that requires assistance, and a wireless traffic offload service can be provided for the access device 112.

The assistance request information sequence number is used to indicate the priority of the assistance request corresponding to the assistance response information, so that the mobile access point can identify, according to the assistance request information sequence number in the assistance command information, the priority of the assistance request corresponding to the assistance response information. Therefore, the mobile access point 120 can preferentially respond to an assistance request with a high priority according to priorities of assistance requests.

Optionally, when the selected mobile access point 120 moves to the target location according to the received assistance command information, the selected mobile access point 120 may further transmit assistance status information to the network node. The assistance status information is one or a combination of a location parameter, a time parameter, or an event identifier of the mobile access point that is performing wireless assistance.

The location parameter is used to indicate a current location of the mobile access point 120 that is moving to the location of the access device 112 that requires assistance, so that the network node can determine, according to the location parameter in the assistance status information, the current location of the mobile access point 120 or a difference from a location in an assistance status report that is transmitted previously, and therefore can determine, according to the location parameter, a remaining time required by the mobile access point to arrive at the target location to provide an assistance service.

The time parameter is used to indicate the remaining time required by the mobile access point 120 to arrive at the target location to provide an assistance service, so that the network node can determine, according to the time parameter in the assistance status information, the remaining time required by the mobile access point to arrive at the target location to provide the assistance service.

The event identifier is used to indicate an event that occurs when the mobile access point 120 moves to the target location, for example, an event such as blocking of moving, changing of a moving path, or detection of a radio signal of the device that requires assistance, so that the network node can determine, according to the event identifier in the assistance status information, the event that occurs during moving of the mobile access point 120 to the target location, and therefore can determine, according to the event that occurs, the remaining time required by the mobile access point to arrive at the target location to provide the assistance service.

It may be understood that, the network status information obtained by the network node further includes assistance status information. After obtaining the assistance status information in the network status information, the network node identifies, according to a message identifier in the assistance status information, that the mobile access point 120 has transmitted the assistance status information, and estimates, according to the assistance status information, the remaining time required by the mobile access point 120 to arrive at the location at which wireless assistance needs to be provided.

The network node determines, according to the location parameter in the assistance status information, the current location of the mobile access point 120 or the difference from the location in the assistance status report transmitted previously, and therefore determines, according to the location parameter, the remaining time required by the mobile access point to arrive at the target location to provide the assistance service.

The network node determines, according to the time parameter in the assistance status information, the remaining time required by the mobile access point to arrive at the target location to provide the assistance service.

The network node determines, according to the event identifier in the assistance status information, the event (for example, an event such as blocking of moving, changing of a moving path, or detection of a radio signal of the device that requires assistance) that occurs during moving of the mobile access point 120 to the target location, and therefore determines, according to the event that occurs, the remaining time required by the mobile access point to arrive at the target location to provide the assistance service.

After the network node estimates, according to the assistance status information, the remaining time required by the mobile access point 120 to arrive at the location at which wireless assistance needs to be provided, the network node compares the estimated time with the valid time within which wireless assistance needs to be provided for the access device 112.

When the remaining time estimated by the network node is in the valid time within which wireless assistance needs to be provided, the network node determines that the mobile access point 120 can arrive, as expected, at the location at which wireless assistance needs to be provided. The mobile access point is allowed to continue to move to the target location, until the mobile access point moves to the location at which wireless assistance can be provided for the access device 112 that requires assistance, so as to provide a wireless traffic offload service in a wireless manner for the access device 112 that requires assistance. A method for obtaining the location of the access device 112 may be obtaining the location by querying the locally stored table of mappings between device identifiers and locations. When the device identifier is not stored locally, information may also be transmitted to a node (for example, an access controller or a server) that provides a location query service in the network, so that location information corresponding to the device identifier is queried; in addition, the device identifier and the location information corresponding to the device identifier are stored in the local table of mappings between device identifiers and locations, so that the mobile access point 120 can perform a query locally.

When there is only one mobile access point 120 in the network, and when the remaining time estimated by the network node is not in the valid time within which wireless assistance needs to be provided, the network node determines that the mobile access point 120 cannot arrive, as expected, at the location at which wireless assistance needs to be provided, and abandons the wireless assistance request.

When there are at least two mobile access points 120 in the network, and when the remaining time estimated by the network node is not in the valid time within which wireless assistance needs to be provided, the network node determines that the mobile access point 120 cannot arrive, as expected, at the location at which wireless assistance needs to be provided, and abandons the wireless assistance request, then re-determines, from mobile access points that can provide wireless assistance, a mobile access point 120 that needs to perform wireless assistance to provide wireless assistance, and therefore dynamically adjusts the mobile access point that can provide wireless assistance, to provide wireless assistance.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

Figure 2:
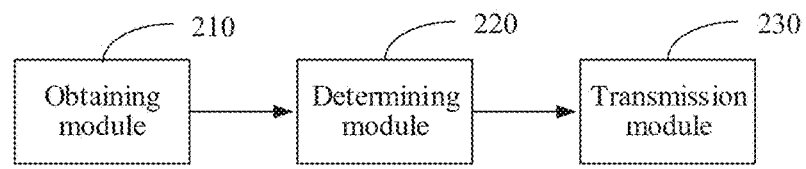
FIG. 2 is a schematic structural diagram of an implementation manner of a wireless assistance apparatus according to this application.

Referring to FIG. 2, FIG. 2 is a schematic structural diagram of an implementation manner of a wireless assistance apparatus according to this application. The wireless assistance apparatus in this implementation manner is generally a network node, including an obtaining module 210, a determining module 220, and a transmission module 230.

The obtaining module 210 is configured to obtain network status information, where the network status information is specifically one or a combination of the following: a user quantity, requested bandwidth, data traffic, or a service requirement. The network node is user equipment, an access device, or a control device.

For example, when the network node is user equipment, a user transmits, by using the user equipment, wireless access request information to an access device in an area in which the user equipment is located, so as to obtain a wireless access service provided by the access device. The obtaining module 210 collects wireless service requirement information at an interval of a first preset time. The user equipment is generally a mobile terminal, and may be a mobile phone, or may be a notebook computer.

When the network node is an access device, the obtaining module 210 collects information about a user quantity, requested bandwidth, data traffic, and whether a user service requirement can be met in time in the access device. The access device may be a fixed wireless access point, or may be a mobile access point.

When the network node is a control device, the obtaining module 210 collects information about a user quantity, requested bandwidth, data traffic, and whether a user service requirement can be met in time in a plurality of access devices in an access network.

The determining module 220 is configured to determine, according to the network status information obtained by the obtaining module 210, a mobile access point that needs to perform wireless assistance. Wireless assistance means that a wireless traffic offload service is provided in a wireless manner for an access device that requires assistance.

For example, the determining module 220 determines, according to the network status information, whether an access device that requires the mobile access point to provide wireless assistance exists in the network. When the determining module 220 determines that an access device that requires the mobile access point to provide wireless assistance exists in the network, the determining module 220 determines that the mobile access point in the network needs to perform wireless assistance. A quantity of mobile access points in the network may be one or may be at least two.

For example, when the network node is user equipment, the determining module 220 determines, according to the collected wireless service requirement information, information about whether a wireless service requirement can be met properly, and therefore determines whether the accessed access device requires assistance, and further determines whether an access device that requires the mobile access point to provide wireless assistance exists in the network.

When the network node is an access device, the determining module 220 determines, according to the information about the user quantity, the requested bandwidth, the data traffic, and whether the user service requirement can be met in time, whether the access device itself can meet a user requirement within coverage, and further determines whether an access device that requires the mobile access point to provide wireless assistance exists in the network.

When the network node is a control device, the determining module 220 determines, according to the information about the user quantity, the requested bandwidth, the data traffic, and whether the user service requirement can be met in time, whether each access device can meet a user requirement within coverage, and further determines whether an access device that requires the mobile access point to provide wireless assistance exists in the network.

When the determining module 220 determines that an access device that requires the mobile access point to provide wireless assistance exists in the network, the determining module 220 determines the mobile access point that needs to perform wireless assistance.

The transmission module 230 is configured to transmit assistance command information to the mobile access point determined by the determining module 220, where the assistance command information is information for instructing the mobile access point to perform wireless assistance.

For example, when the network node determines the mobile access point that needs to perform wireless assistance in the network, the transmission module 230 receives information about the mobile access point that needs to perform wireless assistance, and transmits, in broadcast mode, the assistance command information to the mobile access point that needs to perform wireless assistance, so that the mobile access point can obtain, according to the received assistance command information, a location of the access device that requires assistance, move to the target location, and move to a location at which wireless assistance can be provided for the access device that requires assistance, and therefore provide a wireless traffic offload service in a wireless manner for the access device that requires assistance. The assistance command information is information for instructing the mobile access point to perform wireless assistance, and the assistance command information includes at least a message identifier and a location identifier, where the location identifier is a device identifier or a location parameter. The message identifier is used to indicate that the information is assistance command information, so that the mobile access point can determine, according to the message identifier, that the access device that requires the mobile access point to provide wireless assistance exists in the network. The location identifier is used to indicate the location of the access device that requires the mobile access point to provide wireless assistance, so that the mobile access point can identify, according to the location identifier, the location of the access device that requires the mobile access point to provide wireless assistance.

It may be understood that, in this implementation manner, when the determining module 220 determines that the access device that requires the mobile access point to provide wireless assistance exists in the network, and determines the mobile access point that needs to perform wireless assistance, the transmission module 230 transmits the assistance command information to all mobile access points in the network in broadcast mode, so as to transmit the assistance command information to the mobile access point determined by the determining module 220.

In other implementation manners, the transmission module 230 may also select, according to a quantity of mobile access points that need to perform wireless assistance and are determined by the network node, any one of a unicast mode, a multicast mode, or a broadcast mode to transmit the assistance command information to the mobile access points. For example, when the determining module 220 determines that one or two mobile access points 120 need to perform wireless assistance, the transmission module 230 transmits, in unicast mode, the assistance command information to the mobile access points that need to perform wireless assistance. When the determining module 220 determines that three mobile access points are required, the transmission module 230 transmits, in multicast mode, the assistance command information to the mobile access points that need to perform wireless assistance. When the determining module 220 determines that at least four mobile access points are required, the transmission module 230 transmits the assistance command information to all mobile access points in the network in broadcast mode, so as to transmit the assistance command information to the mobile access points that need to perform wireless assistance.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

In another implementation manner, the transmission module 230 is further configured to transmit assistance request information to at least one mobile access point, where the assistance request information includes information about a location at which wireless assistance is required.

For example, when the determining module 220 determines that the access device that requires the mobile access point to provide wireless assistance exists in the network, the transmission module 230 transmits the assistance request information to the at least one mobile access point. The assistance request information includes the information about the location at which wireless assistance is required, so that the mobile access point can determine, according to the information about the location at which wireless assistance is required, whether the mobile access point can move to the location at which wireless assistance is required.

It may be understood that, in this implementation manner, when the determining module 220 determines that the access device that requires the mobile access point to provide wireless assistance exists in the network, the transmission module 230 transmits the assistance request information to all mobile access points in the network in broadcast mode. In other implementation manners, the transmission module 230 may also select any one of the unicast mode, the multicast mode, or the broadcast mode according to a specific situation to transmit the assistance request information to the mobile access point. For example, when the determining module 220 does not know the quantity of mobile access points in the network, the transmission module 230 uses the broadcast mode to transmit the assistance request information to all mobile access points in the network; when the determining module 220 obtains the quantity of mobile access points in the network, the transmission module 230 uses different modes according to the quantity of mobile access points to transmit the assistance request information to the mobile access points, so as to save transmission resources. For example, when the determining module 220 obtains that there is only one or two mobile access points in the network, the transmission module 230 transmits the assistance request information to the mobile access points 120 in unicast mode. When the determining module 220 obtains that there are three mobile access points in the network, the transmission module 230 transmits assistance request information to the mobile access points in multicast mode. When the determining module 220 obtains that there are at least four mobile access points in the network, the transmission module 230 transmits the assistance request information to the mobile access points in broadcast mode. The determining module 220 may query the quantity of mobile access points in the network by broadcast, or may determine the quantity of mobile access points according to information transmitted by the mobile access points in advance, where the specific method is not limited.

It may be understood that, the assistance request information further includes one or a combination of the following: a device capability parameter, a time parameter, an effectiveness parameter, or a device name.

The device capability parameter is used to indicate a capability requirement (for example, hardware configurations supported by the network node such as an access mode, access bandwidth, a backhaul mode, a backhaul rate, a battery standby time, and a chip processing speed, and supported software configurations such as functions) that the mobile access point that provides wireless assistance needs to meet. Only a mobile access point that meets the device capability parameter is qualified to provide wireless assistance for an access device that transmits assistance request information.

The time parameter is used to indicate a start time and an end time at which wireless assistance needs to be provided for the access device, where a difference between the end time and the start time is a valid time, so that the mobile access point can estimate, according to the time parameter, a response time required for arriving at the location at which wireless assistance needs to be provided, and a valid time within which wireless assistance needs to be provided, and therefore can determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The effectiveness parameter is a priority parameter or an assistance effectiveness parameter. The priority parameter is used to indicate a priority of an assistance request, so that the mobile access point can determine, according to the priority of the assistance request, a sequence of responding to the assistance request corresponding to the priority. The assistance effectiveness parameter is used to indicate an assistance effectiveness indicator of the assistance request. The assistance effectiveness indicator is a parameter for measuring network performance enhanced by the mobile access point, for example, a largest capacity, a moving speed, and a delay of the mobile access point. The mobile access point can further determine the assistance effectiveness indicator of the assistance request according to the assistance effectiveness indicator. Wireless assistance is provided only when the mobile access point determines that the assistance effectiveness indicator of the assistance request is higher than an assistance effectiveness indicator of a currently provided wireless access service.

The device name is a network identifier or a service set identifier. The network identifier is used to indicate a network identifier that should be used when the mobile access point that provides wireless assistance for the access device provides a wireless service, for example, a WiFi network; the service set identifier is used to indicate a service set identifier that should be used when the mobile access point that provides wireless assistance for the access device provides a wireless service for the access device, for example, CMCC.

The quantity of mobile access points in the network may be one or may be at least two.

The obtaining module 210 is further configured to receive assistance response information transmitted by the at least one mobile access point, where the assistance response information includes a mobile access point identifier, where the mobile access point identifier represents a mobile access point that can perform wireless assistance.

For example, when the at least one mobile access point receives the assistance request information, determines, according to parameters such as the information about the location at which wireless assistance is required, a current moving speed, and a moving path, that the mobile access point can move to the location at which wireless assistance is required, to provide wireless assistance for the access device that requires assistance, and transmits the assistance response information to the network node, the obtaining module 210 receives the assistance response information transmitted by the at least one mobile access point, and the determining module 220 determines, according to a message identifier in the assistance response information, that a mobile access point can provide wireless assistance, and identifies, according to the mobile access point identifier in the assistance response information, the mobile access point that can provide wireless assistance.

It may be understood that, the assistance response information received by the obtaining module 210 further includes one or a combination of the following: a device capability parameter, an operating status parameter, a time parameter, an effectiveness parameter, or an assistance request information sequence number.

For example, the assistance response information that is transmitted by the mobile access point that can provide wireless assistance and received by the obtaining module 210 further includes one or a combination of the following: a device capability parameter, an operating status parameter, a time parameter, an effectiveness parameter, or an assistance request information sequence number, so that the determining module 220 can determine, according to the received assistance response information, from the at least one mobile access point that can provide wireless assistance, the mobile access point that needs to perform wireless assistance. An operating status includes being idle, moving to the location at which wireless assistance needs to be provided, and providing a wireless traffic offload service; the effectiveness parameter is a priority parameter or an assistance effectiveness parameter.

The device capability parameter is used to indicate a capability of the mobile access point (for example, hardware configurations supported by the mobile access point such as an access mode, access bandwidth, a backhaul mode, a backhaul rate, a battery standby time, and a chip processing speed, and supported software configurations such as functions), so that the determining module 220 can select, according to the device capability parameter, from the mobile access points that can provide wireless assistance, a mobile access point that can better meet the capability requirement of the access device that requires assistance, to provide wireless assistance.

The operating status parameter is used to indicate a current operating status of the mobile access point, so that the determining module 220 can preferentially select, according to the current operating status of the mobile access point, a mobile access point that is in an idle state, to provide wireless assistance.

The time parameter is used to indicate the time required by the mobile access point to arrive at the location at which wireless assistance needs to be provided, to provide a wireless traffic offload service, so that the determining module 220 can compare the time parameter with the valid time within which wireless assistance needs to be provided for the access device, so as to select, from the mobile access points that can provide wireless assistance, a mobile access point that can more quickly arrive at the location at which wireless assistance needs to be provided, to provide wireless assistance.

When the effectiveness parameter is a priority parameter, the determining module 220 can identify, according to the priority parameter, a priority of wireless assistance currently provided by the mobile access point, or identify a difference between a priority of wireless assistance currently provided by the mobile access point and a priority indicated in the assistance request information, and therefore can select, from the mobile access points that can provide wireless assistance, a mobile access point that can preferentially respond to the assistance request information, to provide wireless assistance.

When the effectiveness parameter is an assistance effectiveness parameter, the determining module 220 can identify, according to the assistance effectiveness parameter, an assistance effectiveness indicator of wireless assistance currently provided by the mobile access point, or identify a difference between an assistance effectiveness indicator of wireless assistance currently provided by the mobile access point and an assistance effectiveness indicator indicated in the assistance request information. The assistance effectiveness indicator is a parameter for measuring network performance enhanced by the mobile access point, for example, a largest capacity, a moving speed, and a delay of the mobile access point, and therefore can select, from the mobile access points that can provide wireless assistance, a mobile access point that has highest assistance effectiveness to provide wireless assistance.

The assistance request information sequence number is used to indicate a priority of an assistance request corresponding to the assistance response information, so that the determining module 220 can further identify, according to the assistance request information sequence number, the priority of the assistance request corresponding to the assistance response information, and therefore can select a mobile access point with a high priority to provide wireless assistance.

The determining module 220 is further configured to determine, according to the assistance response information obtained by the obtaining module 210, from the at least one mobile access point, the mobile access point that needs to perform wireless assistance. For example, when the assistance response information is received, the determining module 220 determines, according to the message identifier in the assistance response information, that a mobile access point can provide wireless assistance, and identifies, according to the mobile access point identifier in the assistance response information, the mobile access point that can provide wireless assistance. The determining module 220 determines, according to parameters in the assistance response information transmitted by each mobile access point, from the at least one mobile access point, a mobile access point that needs to perform wireless assistance.

A quantity of mobile access points that need to perform wireless assistance is decided according to a specific situation of network status information. For example, the quantity is decided according to a user quantity, requested bandwidth, data traffic, or a service requirement.

The determining module 220 determines, from the at least one mobile access point that can provide wireless assistance, the mobile access point that needs to perform wireless assistance. A followed principle may be: preferentially selecting a mobile access point currently in an idle state to provide wireless assistance, and when there are multiple mobile access points currently in idle states, selecting, according to the capability parameter of each mobile access point, the priority parameter or assistance effectiveness parameter of the currently provided service, and the priority parameter or assistance effectiveness parameter of the wireless assistance, a mobile access point that provides wireless assistance and can better meet the capability requirement of the access device requiring assistance and can more quickly arrive at the location at which wireless assistance needs to be provided, to provide wireless assistance. In other implementation manners, other selection principles may be followed, which is decided according to an actual situation.

For example, the determining module 220 identifies the capability of the mobile access point according to the device capability parameter in the assistance response information, and selects, from the mobile access points that can provide wireless assistance, a mobile access point that can better meet the capability requirement of the access device that requires assistance, to provide wireless assistance.

The determining module 220 identifies the current operating status of the mobile access point according to the operating status parameter in the assistance response information, and preferentially selects a mobile access point that is in an idle state, to provide wireless assistance.

The determining module 220 identifies, according to the time parameter in the assistance response information, the time required by the mobile access point to arrive at the location at which wireless assistance needs to be provided, to provide a wireless traffic offload service, compares the time parameter with the valid time within which wireless assistance needs to be provided for the access device, and selects, from the mobile access points that can provide wireless assistance, a mobile access point that can more quickly arrive at the location at which wireless assistance needs to be provided, to provide wireless assistance.

The determining module 220 identifies, according to the effectiveness parameter in the assistance response information, the priority of wireless assistance currently provided by the mobile access point, or identifies the difference between the priority of wireless assistance currently provided by the mobile access point and the priority indicated in the assistance request information, and selects, from the mobile access points that can provide wireless assistance, a mobile access point that can preferentially respond to the assistance request information, to provide wireless assistance.

The determining module 220 identifies, according to the effectiveness parameter in the assistance response information, the assistance effectiveness indicator of wireless assistance currently provided by the mobile access point, or identifies the difference between the assistance effectiveness indicator of wireless assistance currently provided by the mobile access point and the assistance effectiveness indicator indicated in the assistance request information, and selects, from the mobile access points that can provide wireless assistance, the mobile access point that has highest assistance effectiveness to provide wireless assistance.

The determining module 220 identifies, according to the assistance request information sequence number in the assistance response information, the priority of the assistance request corresponding to the assistance response information, and selects a mobile access point with a high priority to provide wireless assistance.

After the determining module 220 determines that the mobile access point that needs to perform wireless assistance provides wireless assistance for the access device that requires assistance, the transmission module 230 transmits the assistance command information according to the mobile access point determined by the determining module 220.

It may be understood that, the assistance command information further includes one or a combination of the following: a mobile access point identifier, a device name, or an assistance request information sequence number.

The mobile access point identifier is used to indicate the mobile access point that needs to perform wireless assistance, so that the selected mobile access point can determine, according to the mobile access point identifier in the assistance command information, whether the mobile access point is the selected mobile access point, and when a determining result is yes, move to the location at which wireless assistance can be provided for the access device that requires assistance, to provide a wireless traffic offload service, or otherwise, consider that incorrect assistance command information is received and perform no processing.

The device name is used to indicate a device name that should be used by the mobile access point that needs to perform wireless assistance, when the mobile access point provides a wireless service. Therefore, the device name used when the mobile access point provides the wireless service keeps consistent with a device name used by the access device that requires assistance, and a wireless traffic offload service can be provided for the access device. When the device name is a network identifier, the selected mobile access point can identify, according to the network identifier in the assistance command information, a network identifier (for example, a WiFi network) that should be used when the mobile access point provides a wireless service. Therefore, the network identifier used when the mobile access point provides the wireless service keeps consistent with a network identifier used by the access device that requires assistance, and a wireless traffic offload service can be provided for the access device.

When the device name is a service set identifier, the selected mobile access point can determine, according to the service set identifier, a service set identifier (for example, CMCC) that should be used when the mobile access point provides a wireless service. Therefore, the service set identifier used when the mobile access point provides the wireless service keeps consistent with a service set identifier used by the access device that requires assistance, and a wireless traffic offload service can be provided for the access device.

The assistance request information sequence number is used to indicate the priority of the assistance request corresponding to the assistance response information, so that the network node can identify, according to the assistance request information sequence number in the assistance command information, the priority of the assistance request corresponding to the assistance response information. Therefore, the mobile access point can preferentially respond to an assistance request with a high priority according to priorities of assistance requests.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

When at least two mobile access points in the network can provide wireless assistance for the access device that requires assistance, the network node may further select a most suitable mobile access point from the mobile access points to provide wireless assistance.

In another implementation manner, the network status information obtained by the obtaining module 210 further includes assistance status information, where the assistance status information is one or a combination of a location parameter, a time parameter, or an event identifier of the mobile access point that is performing wireless assistance.

For example, when the determined mobile access point receives the assistance command information and moves to the target location, the obtaining module 210 receives the assistance status information transmitted by the mobile access point. The assistance status information is one or a combination of a location parameter, a time parameter, or an event identifier of the mobile access point that is moving to the location of the access device that requires assistance.

The location parameter is used to indicate a current location of the mobile access point, so that the determining module 220 can determine, according to the location parameter in the assistance status information, the current location of the mobile access point or a difference from a location in an assistance status report that is transmitted previously, and therefore can determine, according to the location parameter, a remaining time required by the mobile access point to arrive at the target location to provide an assistance service.

The time parameter is used to indicate the remaining time required by the mobile access point to arrive at the target location to provide an assistance service, so that the determining module 220 can determine, according to the time parameter in the assistance status information, the remaining time required by the mobile access point to arrive at the target location to provide the assistance service.

The event identifier is used to indicate an event that occurs when the mobile access point moves to the target location, for example, an event such as blocking of moving, changing of a moving path, or detection of a radio signal of the device that requires assistance, so that the determining module 220 can determine, according to the event identifier in the assistance status information, the event that occurs during moving of the mobile access point to the target location, and therefore can determine, according to the event that occurs, the remaining time required by the mobile access point to arrive at the target location to provide the assistance service.

The determining module 220 is further configured to identify, according to a message identifier in the assistance status information obtained by the obtaining module 210, that the mobile access point has transmitted the assistance status information, and estimates, according to the assistance status information, the remaining time required by the mobile access point to arrive at the location at which wireless assistance needs to be provided.

The determining module 230 determines, according to the location parameter in the assistance status information, the current location of the mobile access point or the difference from the location in the assistance status report transmitted previously, and therefore determines, according to the location parameter, the remaining time required by the mobile access point to arrive at the target location to provide the assistance service.

The determining module 230 determines, according to the time parameter in the assistance status information, the remaining time required by the mobile access point to arrive at the target location to provide the assistance service.

The determining module 230 determines, according to the event identifier in the assistance status information, the event (for example, an event such as blocking of moving, changing of a moving path, or detection of a radio signal of the device that requires assistance) that occurs during moving of the mobile access point to the target location, and therefore determines, according to the event that occurs, the remaining time required by the mobile access point to arrive at the target location to provide the assistance service.

After the determining module 230 estimates, according to the assistance status information, the remaining time required by the mobile access point to arrive at the location at which wireless assistance needs to be provided, the determining module 230 compares the estimated time with the valid time within which wireless assistance needs to be provided for the access device.

When the remaining time estimated by the determining module 230 is in the valid time within which wireless assistance needs to be provided, the determining module 230 determines that the mobile access point can arrive, as expected, at the location at which wireless assistance needs to be provided. The determining module 230 allows the mobile access point to continue to move to the target location, until the mobile access point moves to the location at which wireless assistance can be provided for the access device that requires assistance, so as to provide a wireless traffic offload service in a wireless manner for the access device that requires assistance.

When there is only one mobile access point in the network, and when the remaining time estimated by the network node is not in the valid time within which wireless assistance needs to be provided, the determining module 220 determines that the mobile access point cannot arrive, as expected, at the location at which wireless assistance needs to be provided, and abandons the wireless assistance request.

When there are at least two mobile access points in the network, and when the remaining time estimated by the network node is not in the valid time within which wireless assistance needs to be provided, the determining module 220 determines that the mobile access point cannot arrive, as expected, at the location at which wireless assistance needs to be provided, and abandons the wireless assistance request, then re-determines, from mobile access points that can provide wireless assistance, a mobile access point that needs to perform wireless assistance to provide wireless assistance, and therefore dynamically adjusts the mobile access point that can provide wireless assistance, to provide wireless assistance.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

When at least two mobile access points in the network can provide wireless assistance for the access device that requires assistance, the network node may further select a most suitable mobile access point from the mobile access points to provide wireless assistance; and in addition, can estimate more accurately, according to an assistance status report transmitted by the mobile access point, a time required by the mobile access point to arrive at the location at which wireless assistance needs to be provided. Therefore, the mobile access point that can provide wireless assistance is dynamically adjusted to provide wireless assistance.

Figure 3:
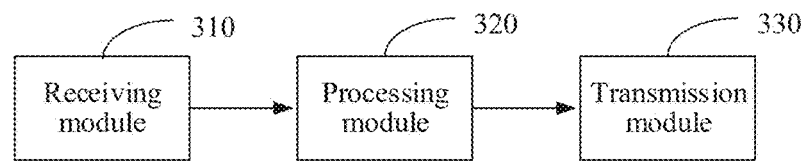
FIG. 3 is a schematic structural diagram of an implementation manner of a mobile access point according to this application.

Referring to FIG. 3, FIG. 3 is a schematic structural diagram of an implementation manner of a mobile access point according to this application. The mobile access point in this implementation manner may be a mobile WiFi robot, and includes a receiving module 310 and a processing module 320.

The receiving module 310 is configured to receive assistance command information transmitted by a network node. The mobile access point is an access point that can move. The network node is user equipment, an access device, or a control device. Wireless assistance means that a wireless traffic offload service is provided for an access device that requires assistance. For example, when the network node determines a mobile access point that needs to perform wireless assistance, and transmits an assistance command to the mobile access point in a network, the receiving module 310 receives assistance command information transmitted by the network node. The assistance command information is information for instructing the mobile access point to perform wireless assistance, and the assistance command information includes at least a message identifier and a location identifier, where the location identifier is a device identifier or a location parameter. The message identifier is used to indicate that the information is assistance command information, so that the mobile access point can determine, according to the message identifier, that the access device that requires the mobile access point to provide wireless assistance exists in the network. The location identifier is used to indicate a location of the access device that requires the mobile access point to provide wireless assistance, so that the mobile access point can identify, according to the location identifier, the location of the access device that requires the mobile access point to provide wireless assistance.

A quantity of mobile access points in the network may be one or may be at least two.

The processing module 320 is configured to perform wireless assistance according to the assistance command information received by the receiving module 310. For example, after the assistance command information is received, the processing module 320 determines, according to the message identifier in the assistance command information, that the network node allows the mobile access point to provide wireless assistance, and identifies, according to the location identifier in the assistance command information, the location of the access device that requires the mobile access point to provide wireless assistance. The location identifier is a device identifier or a location parameter. When the location identifier is a device identifier, the access device that requires assistance is identified according to the device identifier, so that the location of the access device is found. When the location identifier is a location parameter, a target location at which the mobile access point needs to provide wireless assistance is identified according to the location parameter.

A method for obtaining the location of the access device by the processing module 320 may be obtaining the location by querying a locally stored table of mappings between device identifiers and locations. When the device identifier is not stored locally, information may also be transmitted to a node (for example, an access controller or a server) that provides a location query service in the network, so that location information corresponding to the device identifier is queried; in addition, the device identifier and the location information corresponding to the device identifier are stored in the local table of mappings between device identifiers and locations, so that the processing module 320 can perform a query locally.

After the processing module 320 obtains the location of the access device that requires assistance, the mobile access point moves to the target location, and moves to the location at which wireless assistance can be provided for the access device that requires assistance. Therefore, a wireless traffic offload service is provided in a wireless manner for the access device that requires assistance.

In the foregoing solution, a mobile access point receives a wireless assistance command transmitted by a network node, and moves, according to the wireless assistance command, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

In another implementation manner, the receiving module 310 is further configured to receive assistance request information transmitted by the network node, where the assistance request information includes information about a location at which wireless assistance is required. For example, when the network node determines the mobile access point that needs to perform wireless assistance, and transmits the assistance request information to at least one mobile access point, the receiving module 310 receives the assistance request information transmitted by the network node. The assistance request information includes the information about the location at which wireless assistance is required.

It may be understood that, the assistance request information further includes one or a combination of the following: a device capability parameter, a time parameter, an effectiveness parameter, or a device name. For example, the assistance request information transmitted by the network node further includes one or a combination of the following: a device capability parameter, a time parameter, an effectiveness parameter, or a device name.

The device capability parameter is used to indicate a capability requirement (for example, hardware configurations supported by the network node such as an access mode, access bandwidth, a backhaul mode, a backhaul rate, a battery standby time, and a chip processing speed, and supported software configurations such as functions) that the mobile access point that provides wireless assistance needs to meet. Only a mobile access point that meets the device capability parameter is qualified to provide wireless assistance for an access device that transmits assistance request information.

The time parameter is used to indicate a start time and an end time at which wireless assistance needs to be provided for the access device, where a difference between the end time and the start time is a valid time, so that the processing module 320 can estimate, according to the time parameter, a response time required for arriving at the location at which wireless assistance needs to be provided, and a valid time within which wireless assistance needs to be provided, and therefore can determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The effectiveness parameter is a priority parameter or an assistance effectiveness parameter. The priority parameter is used to indicate a priority of an assistance request, so that the processing module 320 can determine, according to the priority of the assistance request, a sequence of responding to the assistance request corresponding to the priority. The assistance effectiveness parameter is used to indicate an assistance effectiveness indicator of the assistance request. The assistance effectiveness indicator is a parameter for measuring network performance enhanced by the mobile access point, for example, a largest capacity, a moving speed, and a delay of the mobile access point. The processing module 320 can further determine the assistance effectiveness indicator of the assistance request according to the assistance effectiveness indicator. Wireless assistance is provided only when the processing module 320 determines that the assistance effectiveness indicator of the assistance request is higher than an assistance effectiveness indicator of a currently provided wireless access service.

The device name is a network identifier or a service set identifier. The network identifier is used to indicate a network identifier that should be used when the mobile access point that provides wireless assistance for the access device provides a wireless service, for example, a WiFi network; the service set identifier is used to indicate a service set identifier that should be used when the mobile access point that provides wireless assistance for the access device provides a wireless service for the access device, for example, CMCC.

The processing module 320 is further configured to determine, according to the assistance request information received by the receiving module 310, whether wireless assistance can be performed. When the processing module 320 determines that wireless assistance can be performed, the transmission module 330 is configured to transmit assistance response information to the network node, where the assistance response information includes a mobile access point identifier. For example, when the assistance request information is received, the processing module 320 determines, according to a message identifier in the assistance request information, whether the access device that requires the mobile access point to provide wireless assistance exists in the network, identifies, according to a location parameter in the assistance request information, the device identifier of the access device that requires the mobile access point to provide wireless assistance, and determines the location of the access device according to the device identifier of the access device.

After the processing module 320 determines the location of the access device that needs to be provided with wireless assistance, the processing module 320 determines, according to parameters such as the location of the access device that needs to be provided with wireless assistance, a current moving speed, and a moving path, whether the mobile access point can move, within the valid time within which wireless assistance needs to be provided, to the location at which wireless assistance can be provided for the access device that requires assistance, to perform wireless assistance.

It may be understood that, the processing module 320 may further determine, according to the device capability parameter in the assistance request information, whether the mobile access point meets the capability requirement required for providing wireless assistance for the access device that requires assistance. When the processing module 320 determines that the mobile access point meets the device capability parameter, the mobile access point is qualified to provide wireless assistance for the access device that transmits the assistance request information.

The processing module 320 may further estimate, according to the time parameter in the assistance request information, the response time required for arriving at the location at which wireless assistance needs to be provided, and the valid time within which wireless assistance needs to be provided, and determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The processing module 320 may further identify, according to the priority parameter in the assistance request information, the priority corresponding to the assistance request, and determine, according to the priority corresponding to the assistance request, the sequence of responding to the assistance request corresponding to the priority. The processing module 320 may further identify, according to the assistance effectiveness parameter in the assistance request information, the assistance effectiveness parameter of the assistance request, determine the assistance effectiveness indicator of the assistance request according to the assistance effectiveness indicator, and provide wireless assistance only when the processing module 320 determines that the assistance effectiveness indicator of the assistance request is higher than the assistance effectiveness indicator of the currently provided wireless access service.

The processing module 320 may further identify, according to the device name in the assistance request information, the network identifier (for example, a WiFi network) or the service set identifier (for example, CMCC) that should be used when the mobile access point that provides wireless assistance for the access device provides the wireless service.

When the processing module 320 determines that the mobile access point can move, within the valid time within which wireless assistance needs to be provided, to the location at which wireless assistance can be provided for the access device that requires assistance, to provide wireless assistance, the transmission module 330 transmits assistance response information to the network node. The assistance response information includes at least a mobile access point identifier, so that the network node can identify, according to the mobile access point identifier in the assistance response information, the mobile access point that can provide wireless assistance.

It may be understood that, the assistance response information further includes one or a combination of the following: a device capability parameter, an operating status parameter, a time parameter, an effectiveness parameter, or an assistance request information sequence number.

For example, the assistance response information transmitted by the transmission module 330 further includes one or a combination of the following: a device capability parameter, an operating status parameter, a time parameter, an effectiveness parameter, or an assistance request information sequence number. Therefore, the network node can determine, according to the received assistance response information, from the at least one mobile access point that can provide wireless assistance, the mobile access point that needs to perform wireless assistance. An operating status includes being idle, moving to the location at which wireless assistance needs to be provided, and providing a wireless traffic offload service; the effectiveness parameter is a priority parameter or an assistance effectiveness parameter.

The device capability parameter is used to indicate a capability of the mobile access point (for example, hardware configurations supported by the mobile access point such as an access mode, access bandwidth, a backhaul mode, a backhaul rate, a battery standby time, and a chip processing speed, and supported software configurations such as functions), so that the network node can select, according to the device capability parameter, from the mobile access points that can provide wireless assistance, a mobile access point that can better meet the capability requirement of the access device that requires assistance, to provide wireless assistance.

The operating status parameter is used to indicate a current operating status of the mobile access point, so that the network node can preferentially select, according to the current operating status of the mobile access point, a mobile access point that is in an idle state, to provide wireless assistance.

The time parameter is used to indicate the time required by the mobile access point to arrive at the location at which wireless assistance needs to be provided, to provide a wireless traffic offload service, so that the network node can compare the time parameter with the valid time within which wireless assistance needs to be provided for the access device, so as to select, from the mobile access points that can provide wireless assistance, a mobile access point that can more quickly arrive at the location at which wireless assistance needs to be provided, to provide wireless assistance.

When the effectiveness parameter is a priority parameter, the network node can identify, according to the priority parameter, a priority of wireless assistance currently provided by the mobile access point, or identify a difference between a priority of wireless assistance currently provided by the mobile access point and a priority indicated in the assistance request information, and therefore can select, from the mobile access points that can provide wireless assistance, a mobile access point that can preferentially respond to the assistance request information, to provide wireless assistance.

When the effectiveness parameter is an assistance effectiveness parameter, the network node can identify, according to the assistance effectiveness parameter, an assistance effectiveness indicator of wireless assistance currently provided by the mobile access point, or identify a difference between an assistance effectiveness indicator of wireless assistance currently provided by the mobile access point and an assistance effectiveness indicator indicated in the assistance request information. The assistance effectiveness indicator is a parameter for measuring network performance enhanced by the mobile access point, for example, a largest capacity, a moving speed, and a delay of the mobile access point, and therefore can select, from the mobile access points that can provide wireless assistance, a mobile access point that has highest assistance effectiveness to provide wireless assistance.

The assistance request information sequence number is used to indicate a priority of an assistance request corresponding to the assistance response information, so that the network node can further identify, according to the assistance request information sequence number, the priority of the assistance request corresponding to the assistance response information, and therefore can select a mobile access point with a high priority to provide wireless assistance.

It may be understood that, the assistance command information further includes one or a combination of the following: a mobile access point identifier, a device name, or an assistance request information sequence number. For example, when the network node determines, according to the assistance response information, from the at least one mobile access point that can provide wireless assistance, the mobile access point that needs to perform wireless assistance, and transmits the assistance command information to the mobile access point, the assistance command information received by the receiving module 310 further includes one or a combination of the following: a mobile access point identifier, a device name, or an assistance request information sequence number. An operating status includes being idle, moving to the location at which wireless assistance needs to be provided, and providing a wireless traffic offload service; the effectiveness parameter is a priority parameter or an assistance effectiveness parameter. Therefore, the processing module 320 controls, according to the assistance command information, the mobile access point to perform wireless assistance.

The mobile access point identifier is used to indicate the mobile access point that needs to perform wireless assistance. The processing module 320 determines, according to the mobile access point identifier in the assistance command information, whether the mobile access point is the selected mobile access point, and when a determining result is yes, controls the mobile access point to move to the location at which wireless assistance can be provided for the access device that requires assistance, to provide a wireless traffic offload service, or otherwise, considers that incorrect assistance command information is received and performs no processing.

The device name is used to indicate a device name that should be used by the mobile access point that needs to perform wireless assistance, when the mobile access point provides a wireless service. Therefore, the device name used when the mobile access point provides the wireless service keeps consistent with a device name used by the access device that requires assistance, and a wireless traffic offload service can be provided for the access device. When the processing module 320 identifies, according to the assistance command information, that the device name is a network identifier, the processing module 320 identifies, according to the network identifier in the assistance command information, a network identifier (for example, a WiFi network) that should be used when the mobile access point provides a wireless service. Therefore, the network identifier used when the mobile access point provides the wireless service keeps consistent with a network identifier used by the access device that requires assistance, and a wireless traffic offload service can be provided for the access device.

When the processing module 320 identifies, according to the assistance command information, that the device name is a service set identifier, the processing module 320 identifies, according to the service set identifier in the assistance command information, a service set identifier (for example, CMCC) that should be used when the mobile access point provides a wireless service. Therefore, the service set identifier used when the mobile access point provides the wireless service keeps consistent with a service set identifier used by the access device that requires assistance, and a wireless traffic offload service can be provided for the access device.

The assistance request information sequence number is used to indicate the priority of the assistance request corresponding to the assistance response information. The processing module 320 identifies, according to the assistance request information sequence number in the assistance command information, the priority of the assistance request corresponding to the assistance response information, and therefore can preferentially respond to an assistance request with a high priority according to priorities of assistance requests.

In the foregoing solution, a mobile access point receives a wireless assistance request transmitted by a network node, and moves, according to the wireless assistance request, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

When at least two mobile access points in the network can provide wireless assistance for the access device that requires assistance, the network node may further select a most suitable mobile access point from the mobile access points to provide wireless assistance.

In another implementation manner, the transmission module 330 is further configured to transmit assistance status information to the network node, where the assistance status information includes one or a combination of a location parameter, a time parameter, or an event identifier.

For example, when the selected mobile access point moves to the target location according to the received assistance command information, the transmission module 330 may further transmit the assistance status information to the network node, so that after the network node obtains the assistance status information in network status information, the network node can identify, according to a message identifier in the assistance status information, that the mobile access point has transmitted the assistance status information, and can estimate, according to the assistance status information, a remaining time required by the mobile access point to arrive at the location at which wireless assistance needs to be provided. The assistance status information is one or a combination of a location parameter, a time parameter, or an event identifier of the mobile access point that is performing wireless assistance.

The location parameter is used to indicate a current location of the mobile access point that is moving to the location of the access device that requires assistance, so that when the network node obtains the assistance status information in the network status information, the network node can determine, according to the location parameter in the assistance status information, the current location of the mobile access point or a difference from a location in an assistance status report that is transmitted previously, and therefore can determine, according to the location parameter, the remaining time required by the mobile access point to arrive at the target location to provide an assistance service.

The time parameter is used to indicate the remaining time required by the mobile access point to arrive at the target location to provide an assistance service, so that when the network node obtains the assistance status information in the network status information, the network node can determine, according to the time parameter in the assistance status information, the remaining time required by the mobile access point to arrive at the target location to provide the assistance service.

The event identifier is used to indicate an event that occurs when the mobile access point moves to the target location, for example, an event such as blocking of moving, changing of a moving path, or detection of a radio signal of the device that requires assistance, so that when the network node obtains the assistance status information in the network status information, the network node can determine, according to the event identifier in the assistance status information, the event that occurs during moving of the mobile access point to the target location, and therefore can determine, according to the event that occurs, the remaining time required by the mobile access point to arrive at the target location to provide the assistance service.

It may be understood that, in this implementation manner, the processing module 320 may control the transmission module 330 to periodically transmit the assistance status information to the network node, or may use an event to trigger the transmission module 330 to transmit the assistance status information to the network node, which is specifically not limited herein. In other implementation manners, other manners may also be used.

In the foregoing solution, a mobile access point receives a wireless assistance request transmitted by a network node, and moves, according to the wireless assistance request, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

When at least two mobile access points in the network can provide wireless assistance for the access device that requires assistance, the network node may further select a most suitable mobile access point from the mobile access points to provide wireless assistance; and in addition, can estimate more accurately, according to an assistance status report transmitted by the mobile access point, a time required by the mobile access point to arrive at the location at which wireless assistance needs to be provided. Therefore, the mobile access point that can provide wireless assistance is dynamically adjusted to provide wireless assistance.

Figure 4:
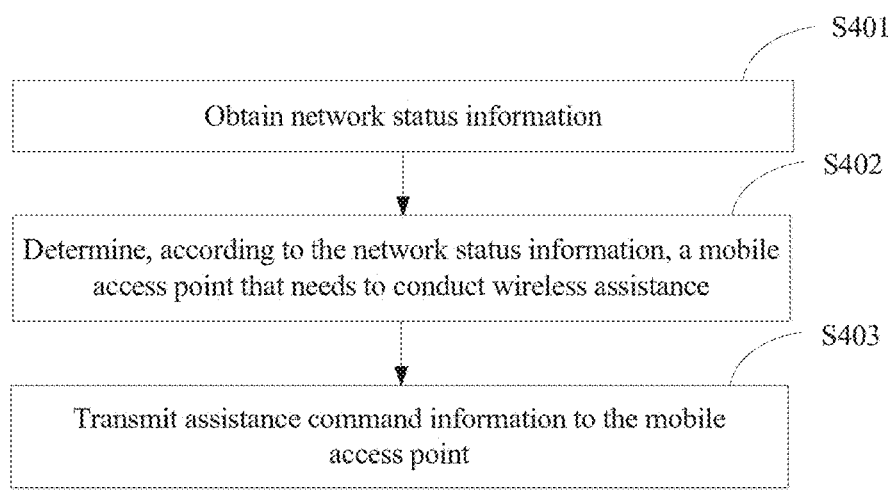
FIG. 4 is a flowchart of a first implementation manner of a wireless assistance method according to this application.

Referring to FIG. 4, FIG. 4 is a flowchart of a first implementation manner of a wireless assistance method according to this application. This implementation manner is described from a perspective of a network node, where the network node may be a control device, an access device, or user equipment. This implementation manner includes the following steps.

S401. Obtain network status information, where the network status information is specifically one or a combination of the following: a user quantity, requested bandwidth, data traffic, or a service requirement.

A network node obtains network status information, where the network status information is specifically one or a combination of the following: a user quantity, requested bandwidth, data traffic, or a service requirement. The network node is user equipment, an access device, or a control device.

For example, when the network node is user equipment, a user transmits, by using the user equipment, wireless access request information to an access device in an area in which the user equipment is located, so as to obtain a wireless access service provided by the access device. The user equipment collects wireless service requirement information at an interval of a first preset time. The user equipment is generally a mobile terminal, and may be a mobile phone, or may be a notebook computer.

When the network node is an access device, the access device collects information about a user quantity, requested bandwidth, data traffic, and whether a user service requirement can be met in time in the access device. The access device may be a fixed wireless access point, or may be a mobile access point.

When the network node is a control device, the control device collects information about a user quantity, requested bandwidth, data traffic, and whether a user service requirement can be met in time in a plurality of access devices in an access network.

S402. Determine, according to the network status information, a mobile access point that needs to perform wireless assistance.

The network node determines, according to the network status information, whether an access device that requires the mobile access point to provide wireless assistance exists in the network. Wireless assistance means that a wireless traffic offload service is provided in a wireless manner for an access device that requires assistance.

For example, the network node determines, according to the network status information, whether an access device that requires the mobile access point to provide wireless assistance exists in the network. When the network node determines that an access device that requires the mobile access point to provide wireless assistance exists in the network, the network node determines that the mobile access point in the network needs to perform wireless assistance. A quantity of mobile access points in the network may be one or may be at least two.

For example, when the network node is user equipment, the user equipment determines, according to the collected wireless service requirement information, information about whether a wireless service requirement can be met properly, and therefore determines whether the accessed access device requires assistance, and further determines whether an access device that requires the mobile access point to provide wireless assistance exists in the network.

When the network node is an access device, the access device determines, according to the information about the user quantity, the requested bandwidth, the data traffic, and whether the user service requirement can be met in time, whether the access device itself can meet a user requirement within coverage, and further determines whether an access device that requires the mobile access point to provide wireless assistance exists in the network.

When the network node is a control device, the control device determines, according to the information about the user quantity, the requested bandwidth, the data traffic, and whether the user service requirement can be met in time, whether each access device can meet a user requirement within coverage, and further determines whether an access device that requires the mobile access point to provide wireless assistance exists in the network.

When the network node determines that an access device that requires the mobile access point to provide wireless assistance exists in the network, the network node determines the mobile access point that needs to perform wireless assistance.

S403. Transmit assistance command information to the mobile access point, where the assistance command information is information for instructing the mobile access point to perform wireless assistance.

The network node transmits assistance command information to the mobile access point that needs to perform wireless assistance, where the assistance command information is information for instructing the mobile access point to perform wireless assistance.

For example, when the network node determines the mobile access point that needs to perform wireless assistance in the network, the network node transmits, in broadcast mode, the assistance command information to the mobile access point that needs to perform wireless assistance, so that the mobile access point can obtain, according to the received assistance command information, a location of the access device that requires assistance, move to the target location, and move to a location at which wireless assistance can be provided for the access device that requires assistance, and therefore provide a wireless traffic offload service in a wireless manner for the access device that requires assistance. The assistance command information is information for instructing the mobile access point to perform wireless assistance, and the assistance command information includes at least a message identifier and a location identifier, where the location identifier is a device identifier or a location parameter. The message identifier is used to indicate that the information is assistance command information, so that the mobile access point can determine, according to the message identifier, that the access device that requires the mobile access point to provide wireless assistance exists in the network. The location identifier is used to indicate the location of the access device that requires the mobile access point to provide wireless assistance, so that the mobile access point can identify, according to the location identifier, the location of the access device that requires the mobile access point to provide wireless assistance.

It may be understood that, in this implementation manner, when the network node determines that the access device that requires the mobile access point to provide wireless assistance exists in the network, and determines the mobile access point that needs to perform wireless assistance, the network node transmits the assistance command information to all mobile access points in the network in broadcast mode, so as to transmit the assistance command information to the mobile access point that needs to perform wireless assistance.

In other implementation manners, the network node may also select, according to a quantity of mobile access points that need to perform wireless assistance and are determined by the network node, any one of a unicast mode, a multicast mode, or a broadcast mode to transmit the assistance command information to the mobile access points. For example, when the network node determines that one or two mobile access points need to perform wireless assistance, the network node transmits, in unicast mode, the assistance command information to the mobile access points that need to perform wireless assistance. When the network node determines that three mobile access points are required, the network node transmits, in multicast mode, the assistance command information to the mobile access points that need to perform wireless assistance. When the network node determines that at least four mobile access points are required, the network node transmits the assistance command information to all mobile access points in the network in broadcast mode, so as to transmit the assistance command information to the mobile access points that need to perform wireless assistance.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

Figure 5:
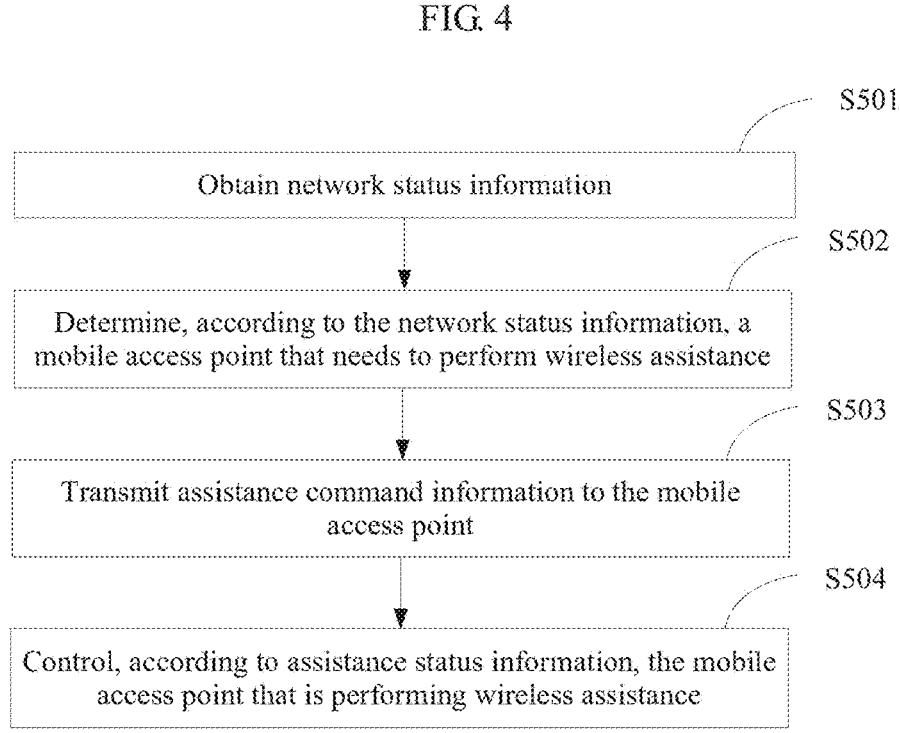
FIG. 5 is a flowchart of a second implementation manner of a wireless assistance method according to this application.

Referring to FIG. 5, FIG. 5 is a flowchart of a second implementation manner of a wireless assistance method according to this application. This implementation manner is described from a perspective of a network node, where the network node may be a control device, an access device, or user equipment. This implementation manner includes the following steps.

S501. Obtain network status information, where the network status information is specifically one or a combination of the following: a user quantity, requested bandwidth, data traffic, or a service requirement. The network status information further includes assistance status information, where the assistance status information is one or a combination of a location parameter, a time parameter, or an event identifier of a mobile access point that is performing wireless assistance.

A network node obtains network status information, where the network status information is specifically one or a combination of the following: a user quantity, requested bandwidth, data traffic, or a service requirement. The network node is user equipment, an access device, or a control device.

For example, when the network node is user equipment, a user transmits, by using the user equipment, wireless access request information to an access device in an area in which the user equipment is located, so as to obtain a wireless access service provided by the access device. The user equipment collects wireless service requirement information at an interval of a first preset time. The user equipment is generally a mobile terminal, and may be a mobile phone, or may be a notebook computer.

When the network node is an access device, the access device collects information about a user quantity, requested bandwidth, data traffic, and whether a user service requirement can be met in time in the access device. The access device may be a fixed wireless access point, or may be a mobile access point.

When the network node is a control device, the control device collects information about a user quantity, requested bandwidth, data traffic, and whether a user service requirement can be met in time in a plurality of access devices in an access network.

S502. Determine, according to the network status information, a mobile access point that needs to perform wireless assistance.

The network node determines, according to the network status information, whether an access device that requires the mobile access point to provide wireless assistance exists in the network. Wireless assistance means that a wireless traffic offload service is provided in a wireless manner for an access device that requires assistance.

For example, the network node determines, according to the network status information, whether an access device that requires the mobile access point to provide wireless assistance exists in the network. When the network node determines that an access device that requires the mobile access point to provide wireless assistance exists in the network, the network node determines that the mobile access point in the network needs to perform wireless assistance. A quantity of mobile access points in the network may be one or may be at least two.

For example, when the network node is user equipment, the user equipment determines, according to the collected wireless service requirement information, information about whether a wireless service requirement can be met properly, and therefore determines whether the accessed access device requires assistance, and further determines whether an access device that requires the mobile access point to provide wireless assistance exists in the network.

When the network node is an access device, the access device determines, according to the information about the user quantity, the requested bandwidth, the data traffic, and whether the user service requirement can be met in time, whether the access device itself can meet a user requirement within coverage, and further determines whether an access device that requires the mobile access point to provide wireless assistance exists in the network.

When the network node is a control device, the control device determines, according to the information about the user quantity, the requested bandwidth, the data traffic, and whether the user service requirement can be met in time, whether each access device can meet a user requirement within coverage, and further determines whether an access device that requires the mobile access point to provide wireless assistance exists in the network.

When the network node determines that an access device that requires the mobile access point to provide wireless assistance exists in the network, the network node determines the mobile access point that needs to perform wireless assistance.

S503. Transmit assistance command information to the mobile access point, where the assistance command information is information for instructing the mobile access point to perform wireless assistance.

The network node transmits assistance command information to the mobile access point that needs to perform wireless assistance, where the assistance command information is information for instructing the mobile access point to perform wireless assistance.

For example, when the network node determines the mobile access point that needs to perform wireless assistance in the network, the network node transmits, in broadcast mode, the assistance command information to the mobile access point that needs to perform wireless assistance, so that the mobile access point can obtain, according to the received assistance command information, a location of the access device that requires assistance, and move to the target location. The assistance command information is information for instructing the mobile access point to perform wireless assistance, and the assistance command information includes at least a message identifier and a location identifier, where the location identifier is a device identifier or a location parameter. The message identifier is used to indicate that the information is assistance command information, so that the mobile access point can determine, according to the message identifier, that the access device that requires the mobile access point to provide wireless assistance exists in the network. The location identifier is used to indicate the location of the access device that requires the mobile access point to provide wireless assistance, so that the mobile access point can identify, according to the location identifier, the location of the access device that requires the mobile access point to provide wireless assistance.

It may be understood that, in this implementation manner, when the network node determines that the access device that requires the mobile access point to provide wireless assistance exists in the network, and determines the mobile access point that needs to perform wireless assistance, the network node transmits the assistance command information to all mobile access points in the network in broadcast mode, so as to transmit the assistance command information to the mobile access point that needs to perform wireless assistance.

In other implementation manners, the network node may also select, according to a quantity of mobile access points that need to perform wireless assistance and are determined by the network node, any one of a unicast mode, a multicast mode, or a broadcast mode to transmit the assistance command information to the mobile access points. For example, when the network node determines that one or two mobile access points need to perform wireless assistance, the network node transmits, in unicast mode, the assistance command information to the mobile access points that need to perform wireless assistance. When the network node determines that three mobile access points are required, the network node transmits, in multicast mode, the assistance command information to the mobile access points that need to perform wireless assistance. When the network node determines that at least four mobile access points are required, the network node transmits the assistance command information to all mobile access points in the network in broadcast mode, so as to transmit the assistance command information to the mobile access points that need to perform wireless assistance.

S504. Control, according to assistance status information, the mobile access point that is performing wireless assistance.

When the mobile access point moves to the target location according to the assistance command information, and transmits the assistance status information to the network node, the network node obtains the assistance status information in the network status information, and controls, according to the assistance status information, the mobile access point that is performing wireless assistance. The assistance status information is one or a combination of a location parameter, a time parameter, or an event identifier of the mobile access point that is moving to the location of the access device that requires assistance.

The location parameter is used to indicate a current location of the mobile access point, so that the network node can determine, according to the location parameter in the assistance status information, the current location of the mobile access point or a difference from a location in an assistance status report that is transmitted previously, and therefore can determine, according to the location parameter, a remaining time required by the mobile access point to arrive at the target location to provide an assistance service.

The time parameter is used to indicate the remaining time required by the mobile access point to arrive at the target location to provide an assistance service, so that the network node can determine, according to the time parameter in the assistance status information, the remaining time required by the mobile access point to arrive at the target location to provide the assistance service.

The event identifier is used to indicate an event that occurs when the mobile access point moves to the target location, for example, an event such as blocking of moving, changing of a moving path, or detection of a radio signal of the device that requires assistance, so that the network node can determine, according to the event identifier in the assistance status information, the event that occurs during moving of the mobile access point to the target location, and therefore can determine, according to the event that occurs, the remaining time required by the mobile access point to arrive at the target location to provide the assistance service.

The network node identifies, according to a message identifier in the assistance status information, that the mobile access point has transmitted the assistance status information, and estimates, according to the assistance status information, the remaining time required by the mobile access point to arrive at the location at which wireless assistance needs to be provided.

The network node determines, according to the location parameter in the assistance status information, the current location of the mobile access point or the difference from the location in the assistance status report transmitted previously, and therefore determines, according to the location parameter, the remaining time required by the mobile access point to arrive at the target location to provide the assistance service.

The network node determines, according to the time parameter in the assistance status information, the remaining time required by the mobile access point to arrive at the target location to provide the assistance service.

The network node determines, according to the event identifier in the assistance status information, the event (for example, an event such as blocking of moving, changing of a moving path, or detection of a radio signal of the device that requires assistance) that occurs during moving of the mobile access point to the target location, and therefore determines, according to the event that occurs, the remaining time required by the mobile access point to arrive at the target location to provide the assistance service.

After the network node estimates, according to the assistance status information, the remaining time required by the mobile access point to arrive at the location at which wireless assistance needs to be provided, the network node compares the estimated time with a valid time within which wireless assistance needs to be provided for the access device.

When the remaining time estimated by the network node is in the valid time within which wireless assistance needs to be provided, the network node determines that the mobile access point can arrive, as expected, at the location at which wireless assistance needs to be provided. The network node allows the mobile access point to continue to move to the target location, until the mobile access point moves to the location at which wireless assistance can be provided for the access device that requires assistance, so as to provide a wireless traffic offload service in a wireless manner for the access device that requires assistance.

When there is only one mobile access point in the network, and when the remaining time estimated by the network node is not in the valid time within which wireless assistance needs to be provided, the network node determines that the mobile access point cannot arrive, as expected, at the location at which wireless assistance needs to be provided, and abandons the wireless assistance request.

When there are at least two mobile access points in the network, and when the remaining time estimated by the network node is not in the valid time within which wireless assistance needs to be provided, the network node determines that the mobile access point cannot arrive, as expected, at the location at which wireless assistance needs to be provided, and abandons the wireless assistance request, then re-determines, from mobile access points that can provide wireless assistance, a mobile access point that needs to perform wireless assistance to provide wireless assistance, and therefore dynamically adjusts the mobile access point that can provide wireless assistance, to provide wireless assistance.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

A time required by the mobile access point to arrive at the location at which wireless assistance needs to be provided can be estimated more accurately according to an assistance status report transmitted by the mobile access point, and therefore, the mobile access point that can provide wireless assistance is dynamically adjusted to provide wireless assistance.

Figure 6:
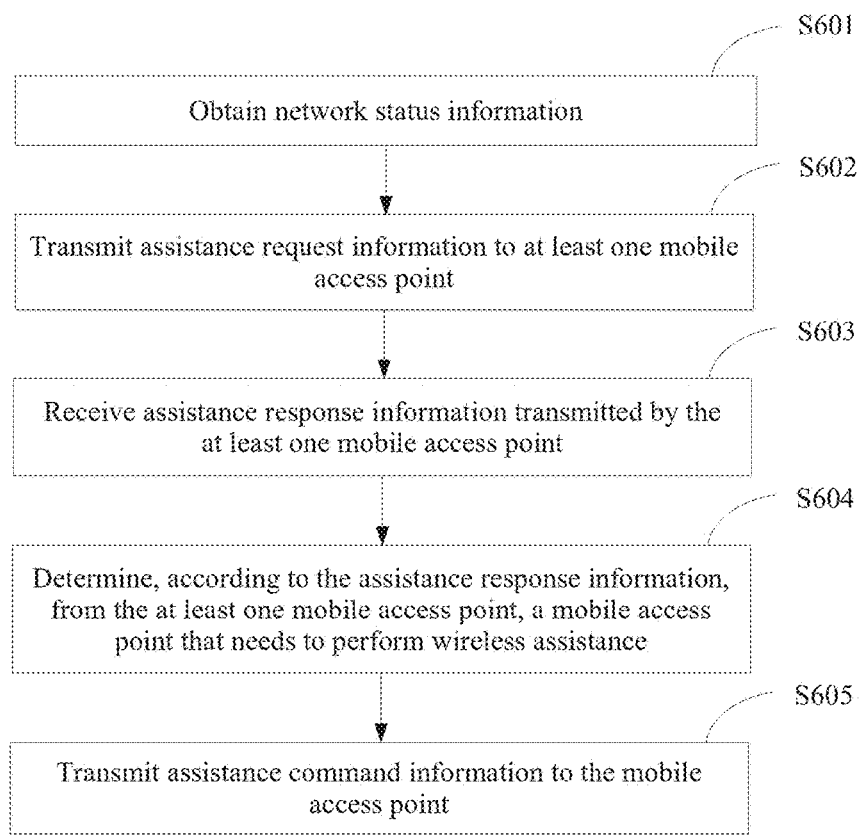
FIG. 6 is a flowchart of a third implementation manner of a wireless assistance method according to this application.

Referring to FIG. 6, FIG. 6 is a flowchart of a third implementation manner of a wireless assistance method according to this application. This implementation manner is described from a perspective of a network node, where the network node may be user equipment, an access device, or a control device. This implementation manner includes the following steps.

S601. Obtain network status information, where the network status information is specifically one or a combination of the following: a user quantity, requested bandwidth, data traffic, or a service requirement.

A network node obtains network status information, where the network status information is specifically one or a combination of the following: a user quantity, requested bandwidth, data traffic, or a service requirement. The network node is user equipment, an access device, or a control device.

For example, when the network node is user equipment, a user transmits, by using the user equipment, wireless access request information to an access device in an area in which the user equipment is located, so as to obtain a wireless access service provided by the access device. The user equipment collects wireless service requirement information at an interval of a first preset time. The user equipment is generally a mobile terminal, and may be a mobile phone, or may be a notebook computer.

When the network node is an access device, the access device collects information about a user quantity, requested bandwidth, data traffic, and whether a user service requirement can be met in time in the access device. The access device may be a fixed wireless access point, or may be a mobile access point.

When the network node is a control device, the control device collects information about a user quantity, requested bandwidth, data traffic, and whether a user service requirement can be met in time in a plurality of access devices in an access network.

The network node determines, according to the network status information, whether an access device that requires a mobile access point to provide wireless assistance exists in the network. Wireless assistance means that a wireless traffic offload service is provided in a wireless manner for an access device that requires assistance.

For example, the network node determines, according to the network status information, whether an access device that requires the mobile access point to provide wireless assistance exists in the network. A quantity of mobile access points in the network may be one or may be at least two.

For example, when the network node is user equipment, the user equipment determines, according to the collected wireless service requirement information, information about whether a wireless service requirement can be met properly, and therefore determines whether the accessed access device requires assistance, and further determines whether an access device that requires the mobile access point to provide wireless assistance exists in the network.

When the network node is an access device, the access device determines, according to the information about the user quantity, the requested bandwidth, the data traffic, and whether the user service requirement can be met in time, whether the access device itself can meet a user requirement within coverage, and further determines whether an access device that requires the mobile access point to provide wireless assistance exists in the network.

When the network node is a control device, the control device determines, according to the information about the user quantity, the requested bandwidth, the data traffic, and whether the user service requirement can be met in time, whether each access device can meet a user requirement within coverage, and further determines whether an access device that requires the mobile access point to provide wireless assistance exists in the network.

When the network node determines that an access device that requires the mobile access point to provide wireless assistance exists in the network, the network node determines the mobile access point that needs to perform wireless assistance.

S602. Transmit assistance request information to at least one mobile access point, where the assistance request information includes information about a location at which wireless assistance is required.

When the network node determines that the access device that requires the mobile access point to provide wireless assistance exists in the network, the network node transmits assistance request information to the at least one mobile access point, where the assistance request information includes information about a location at which wireless assistance is required, so that the mobile access point can determine, according to the information about the location at which wireless assistance is required, whether the mobile access point can move to the location at which wireless assistance is required.

It may be understood that, in this implementation manner, when the network node determines that the access device that requires the mobile access point to provide wireless assistance exists in the network, the network node transmits, in broadcast mode, the assistance request information to all mobile access points in the network. In other implementation manners, the network node may also select any one of a unicast mode, a multicast mode, or a broadcast mode according to a specific situation to transmit the assistance request information to the mobile access point. For example, when the network node does not know the quantity of mobile access points in the network, the network node uses the broadcast mode to transmit the assistance request information to all mobile access points in the network; when the network node obtains the quantity of mobile access points in the network, the network node uses different modes according to the quantity of mobile access points to transmit the assistance request information to the mobile access points, so as to save transmission resources. For example, when the network node obtains that there is only one or two mobile access points in the network, the network node transmits the assistance request information to the mobile access points in unicast mode. When the network node obtains that there are three mobile access points in the network, the network node transmits the assistance request information to the mobile access points in multicast mode. When the network node obtains that there are at least four mobile access points in the network, the network node transmits the assistance request information to the mobile access points in broadcast mode. The network node may query the quantity of mobile access points in the network by broadcast, or may determine the quantity of mobile access points according to information transmitted by the mobile access points in advance, where the specific method is not limited.

It may be understood that, the assistance request information further includes one or a combination of the following: a device capability parameter, a time parameter, an effectiveness parameter, or a device name.

The device capability parameter is used to indicate a capability requirement (for example, hardware configurations supported by the network node such as an access mode, access bandwidth, a backhaul mode, a backhaul rate, a battery standby time, and a chip processing speed, and supported software configurations such as functions) that the mobile access point that provides wireless assistance needs to meet. Only a mobile access point that meets the device capability parameter is qualified to provide wireless assistance for an access device that transmits assistance request information.

The time parameter is used to indicate a start time and an end time at which wireless assistance needs to be provided for the access device, where a difference between the end time and the start time is a valid time, so that the mobile access point can estimate, according to the time parameter, a response time required for arriving at the location at which wireless assistance needs to be provided, and a valid time within which wireless assistance needs to be provided, and therefore can determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The effectiveness parameter is a priority parameter or an assistance effectiveness parameter. The priority parameter is used to indicate a priority of an assistance request, so that the mobile access point can determine, according to the priority of the assistance request, a sequence of responding to the assistance request corresponding to the priority. The assistance effectiveness parameter is used to indicate an assistance effectiveness indicator of the assistance request. The assistance effectiveness indicator is a parameter for measuring network performance enhanced by the mobile access point, for example, a largest capacity, a moving speed, and a delay of the mobile access point. The mobile access point can further determine the assistance effectiveness indicator of the assistance request according to the assistance effectiveness indicator. Wireless assistance is provided only when the mobile access point determines that the assistance effectiveness indicator of the assistance request is higher than an assistance effectiveness indicator of a currently provided wireless access service.

The device name is a network identifier or a service set identifier. The network identifier is used to indicate a network identifier that should be used when the mobile access point that provides wireless assistance for the access device provides a wireless service, for example, a WiFi network; the service set identifier is used to indicate a service set identifier that should be used when the mobile access point that provides wireless assistance for the access device provides a wireless service for the access device, for example, CMCC.

The quantity of mobile access points in the network may be one or may be at least two.

S603. Receive assistance response information transmitted by the at least one mobile access point, where the assistance response information includes a mobile access point identifier, where the mobile access point identifier represents a mobile access point that can perform wireless assistance.

The network node receives assistance response information transmitted by the at least one mobile access point, where the assistance response information includes a mobile access point identifier, where the mobile access point identifier represents a mobile access point that can perform wireless assistance.

For example, when the at least one mobile access point receives the assistance request information, determines, according to parameters such as the information about the location at which wireless assistance is required, a current moving speed, and a moving path, that the mobile access point can move to the location at which wireless assistance is required, to provide wireless assistance for the access device that requires assistance, and transmits the assistance response information to the network node, the network node receives the assistance response information transmitted by the at least one mobile access point, determines, according to a message identifier in the assistance response information, that a mobile access point can provide wireless assistance, and identifies, according to the mobile access point identifier in the assistance response information, the mobile access point that can provide wireless assistance.

It may be understood that, the assistance response information received by the network node further includes one or a combination of the following: a device capability parameter, an operating status parameter, a time parameter, an effectiveness parameter, or an assistance request information sequence number.

For example, the assistance response information that is transmitted by the mobile access point that can provide wireless assistance and received by the network node further includes one or a combination of the following: a device capability parameter, an operating status parameter, a time parameter, an effectiveness parameter, or an assistance request information sequence number, so that the network node can determine, according to the received assistance response information, from the at least one mobile access point that can provide wireless assistance, the mobile access point that needs to perform wireless assistance. An operating status includes being idle, moving to the location at which wireless assistance needs to be provided, and providing a wireless traffic offload service; the effectiveness parameter is a priority parameter or an assistance effectiveness parameter.

The device capability parameter is used to indicate a capability of the mobile access point (for example, hardware configurations supported by the mobile access point such as an access mode, access bandwidth, a backhaul mode, a backhaul rate, a battery standby time, and a chip processing speed, and supported software configurations such as functions), so that the network node can select, according to the device capability parameter, from the mobile access points that can provide wireless assistance, a mobile access point that can better meet the capability requirement of the access device that requires assistance, to provide wireless assistance.

The operating status parameter is used to indicate a current operating status of the mobile access point, so that the network node can preferentially select, according to the current operating status of the mobile access point, a mobile access point that is in an idle state, to provide wireless assistance.

The time parameter is used to indicate the time required by the mobile access point to arrive at the location at which wireless assistance needs to be provided, to provide a wireless traffic offload service, so that the network node can compare the time parameter with the valid time within which wireless assistance needs to be provided for the access device, so as to select, from the mobile access points that can provide wireless assistance, a mobile access point that can more quickly arrive at the location at which wireless assistance needs to be provided, to provide wireless assistance.

When the effectiveness parameter is a priority parameter, the network node can identify, according to the priority parameter, a priority of wireless assistance currently provided by the mobile access point, or identify a difference between a priority of wireless assistance currently provided by the mobile access point and a priority indicated in the assistance request information, and therefore can select, from the mobile access points that can provide wireless assistance, a mobile access point that can preferentially respond to the assistance request information, to provide wireless assistance.

When the effectiveness parameter is an assistance effectiveness parameter, the network node can identify, according to the assistance effectiveness parameter, an assistance effectiveness indicator of wireless assistance currently provided by the mobile access point, or identify a difference between an assistance effectiveness indicator of wireless assistance currently provided by the mobile access point and an assistance effectiveness indicator indicated in the assistance request information. The assistance effectiveness indicator is a parameter for measuring network performance enhanced by the mobile access point, for example, a largest capacity, a moving speed, and a delay of the mobile access point, and therefore can select, from the mobile access points that can provide wireless assistance, a mobile access point that has highest assistance effectiveness to provide wireless assistance.

The assistance request information sequence number is used to indicate a priority of an assistance request corresponding to the assistance response information, so that the network node can further identify, according to the assistance request information sequence number, the priority of the assistance request corresponding to the assistance response information, and therefore can select a mobile access point with a high priority to provide wireless assistance.

S604. Determine, according to the assistance response information, from the at least one mobile access point, a mobile access point that needs to perform wireless assistance.

The network node determines, according to the assistance response information, from the at least one mobile access point, the mobile access point that needs to perform wireless assistance. For example, when the network node receives the assistance response information, the network node determines, according to the message identifier in the assistance response information, that a mobile access point can provide wireless assistance, and identifies, according to the mobile access point identifier in the assistance response information, the mobile access point that can provide wireless assistance. The network node determines, according to parameters in the assistance response information transmitted by each mobile access point, from the at least one mobile access point, a mobile access point that needs to perform wireless assistance.

A quantity of mobile access points that need to perform wireless assistance is decided according to a specific situation of network status information. For example, the quantity is decided according to a user quantity, requested bandwidth, data traffic, or a service requirement.

The network node determines, from the at least one mobile access point that can provide wireless assistance, the mobile access point that needs to perform wireless assistance. A followed principle may be: preferentially selecting a mobile access point currently in an idle state to provide wireless assistance, and when there are multiple mobile access points currently in idle states, selecting, according to the capability parameter of each mobile access point, the priority parameter or assistance effectiveness parameter of the currently provided service, and the priority parameter or assistance effectiveness parameter of the wireless assistance, a mobile access point that provides wireless assistance and can better meet the capability requirement of the access device requiring assistance and can more quickly arrive at the location at which wireless assistance needs to be provided, to provide wireless assistance. In other implementation manners, other selection principles may be followed, which is decided according to an actual situation.

For example, the network node identifies the capability of the mobile access point according to the device capability parameter in the assistance response information, and selects, from the mobile access points that can provide wireless assistance, a mobile access point that can better meet the capability requirement of the access device that requires assistance, to provide wireless assistance.

The network node identifies the current operating status of the mobile access point according to the operating status parameter in the assistance response information, and preferentially selects a mobile access point that is in an idle state, to provide wireless assistance.

The network node identifies, according to the time parameter in the assistance response information, the time required by the mobile access point to arrive at the location at which wireless assistance needs to be provided, to provide a wireless traffic offload service, compares the time parameter with the valid time within which wireless assistance needs to be provided for the access device, and selects, from the mobile access points that can provide wireless assistance, a mobile access point that can more quickly arrive at the location at which wireless assistance needs to be provided, to provide wireless assistance.

The network node identifies, according to the effectiveness parameter in the assistance response information, the priority of wireless assistance currently provided by the mobile access point, or identifies the difference between the priority of wireless assistance currently provided by the mobile access point and the priority indicated in the assistance request information, and selects, from the mobile access points that can provide wireless assistance, a mobile access point that can preferentially respond to the assistance request information, to provide wireless assistance.

The network node identifies, according to the effectiveness parameter in the assistance response information, the assistance effectiveness indicator of wireless assistance currently provided by the mobile access point, or identifies the difference between the assistance effectiveness indicator of wireless assistance currently provided by the mobile access point and the assistance effectiveness indicator indicated in the assistance request information, and selects, from the mobile access points that can provide wireless assistance, the mobile access point that has highest assistance effectiveness to provide wireless assistance.

The network node identifies, according to the assistance request information sequence number in the assistance response information, the priority of the assistance request corresponding to the assistance response information, and selects a mobile access point with a high priority to provide wireless assistance.

S605. Transmit assistance command information to the mobile access point, where the assistance command information is information for instructing the mobile access point to perform wireless assistance.

After the network node determines that the mobile access point that needs to perform wireless assistance provides wireless assistance for the access device that requires assistance, the network node transmits the assistance command information to the determined mobile access point, so that the mobile access point can obtain, according to the received assistance command information, the location of the access device that requires assistance, move to the target location, and move to the location at which wireless assistance can be provided for the access device that requires assistance, and therefore provide a wireless traffic offload service in a wireless manner for the access device that requires assistance. The assistance command information is information for instructing the mobile access point to perform wireless assistance.

It may be understood that, the assistance command information further includes one or a combination of the following: a mobile access point identifier, a device name, or an assistance request information sequence number.

The mobile access point identifier is used to indicate the mobile access point that needs to perform wireless assistance, so that the selected mobile access point can determine, according to the mobile access point identifier in the assistance command information, whether the mobile access point is the selected mobile access point, and when a determining result is yes, move to the location at which wireless assistance can be provided for the access device that requires assistance, to provide a wireless traffic offload service, or otherwise, consider that incorrect assistance command information is received and perform no processing.

The device name is used to indicate a device name that should be used by the mobile access point that needs to perform wireless assistance, when the mobile access point provides a wireless service. Therefore, the device name used when the mobile access point provides the wireless service keeps consistent with a device name used by the access device that requires assistance, and a wireless traffic offload service can be provided for the access device. When the device name is a network identifier, the selected mobile access point can identify, according to the network identifier in the assistance command information, a network identifier (for example, a WiFi network) that should be used when the mobile access point provides a wireless service. Therefore, the network identifier used when the mobile access point provides the wireless service keeps consistent with a network identifier used by the access device that requires assistance, and a wireless traffic offload service can be provided for the access device.

When the device name is a service set identifier, the selected mobile access point can determine, according to the service set identifier, a service set identifier (for example, CMCC) that should be used when the mobile access point provides a wireless service. Therefore, the service set identifier used when the mobile access point provides the wireless service keeps consistent with a service set identifier used by the access device that requires assistance, and a wireless traffic offload service can be provided for the access device.

The assistance request information sequence number is used to indicate the priority of the assistance request corresponding to the assistance response information, so that the network node can identify, according to the assistance request information sequence number in the assistance command information, the priority of the assistance request corresponding to the assistance response information. Therefore, the mobile access point can preferentially respond to an assistance request with a high priority according to priorities of assistance requests.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

Figure 7:
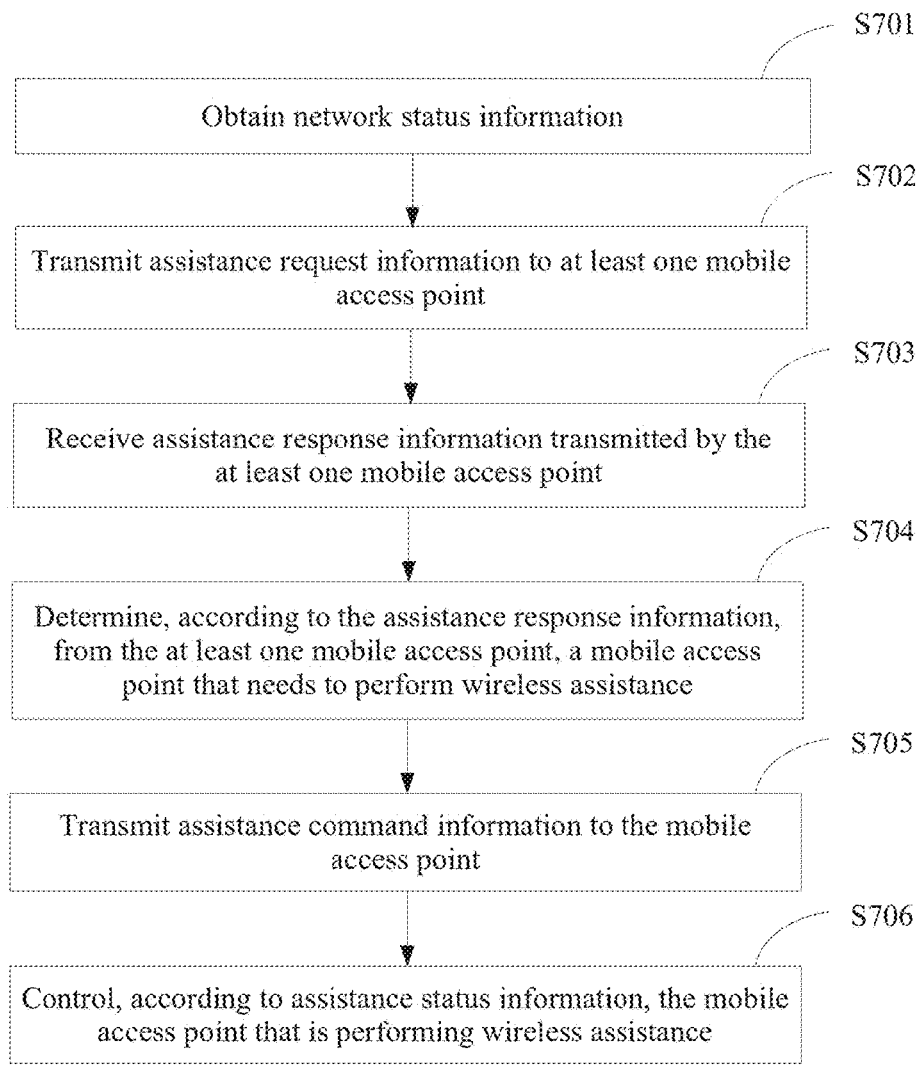
FIG. 7 is a flowchart of a fourth implementation manner of a wireless assistance method according to this application.

Referring to FIG. 7, FIG. 7 is a flowchart of a fourth implementation manner of a wireless assistance method according to this application. This implementation manner is described from a perspective of a network node, where the network node may be user equipment, an access device, or a control device. This implementation manner includes the following steps.

S701. Obtain network status information, where the network status information is specifically one or a combination of the following: a user quantity, requested bandwidth, data traffic, or a service requirement. The network status information further includes assistance status information, where the assistance status information is one or a combination of a location parameter, a time parameter, or an event identifier of a mobile access point that is performing wireless assistance.

A network node obtains network status information, where the network status information is specifically one or a combination of the following: a user quantity, requested bandwidth, data traffic, or a service requirement. The network node is user equipment, an access device, or a control device.

For example, when the network node is user equipment, a user transmits, by using the user equipment, wireless access request information to an access device in an area in which the user equipment is located, so as to obtain a wireless access service provided by the access device. The user equipment collects wireless service requirement information at an interval of a first preset time. The user equipment is generally a mobile terminal, and may be a mobile phone, or may be a notebook computer.

When the network node is an access device, the access device collects information about a user quantity, requested bandwidth, data traffic, and whether a user service requirement can be met in time in the access device. The access device may be a fixed wireless access point, or may be a mobile access point.

When the network node is a control device, the control device collects information about a user quantity, requested bandwidth, data traffic, and whether a user service requirement can be met in time in a plurality of access devices in an access network.

The network node determines, according to the network status information, whether an access device that requires the mobile access point to provide wireless assistance exists in the network. Wireless assistance means that a wireless traffic offload service is provided in a wireless manner for an access device that requires assistance.

For example, the network node determines, according to the network status information, whether an access device that requires the mobile access point to provide wireless assistance exists in the network. A quantity of mobile access points in the network may be one or may be at least two.

For example, when the network node is user equipment, the user equipment determines, according to the collected wireless service requirement information, information about whether a wireless service requirement can be met properly, and therefore determines whether the accessed access device requires assistance, and further determines whether an access device that requires the mobile access point to provide wireless assistance exists in the network.

When the network node is an access device, the access device determines, according to the information about the user quantity, the requested bandwidth, the data traffic, and whether the user service requirement can be met in time, whether the access device itself can meet a user requirement within coverage, and further determines whether an access device that requires the mobile access point to provide wireless assistance exists in the network.

When the network node is a control device, the control device determines, according to the information about the user quantity, the requested bandwidth, the data traffic, and whether the user service requirement can be met in time, whether each access device can meet a user requirement within coverage, and further determines whether an access device that requires the mobile access point to provide wireless assistance exists in the network.

When the network node determines that an access device that requires the mobile access point to provide wireless assistance exists in the network, the network node determines the mobile access point that needs to perform wireless assistance.

S702. Transmit assistance request information to at least one mobile access point, where the assistance request information includes information about a location at which wireless assistance is required.

When the network node determines that the access device that requires the mobile access point to provide wireless assistance exists in the network, the network node transmits assistance request information to the at least one mobile access point, where the assistance request information includes information about a location at which wireless assistance is required, so that the mobile access point can determine, according to the information about the location at which wireless assistance is required, whether the mobile access point can move to the location at which wireless assistance is required.

It may be understood that, in this implementation manner, when the network node determines that the access device that requires the mobile access point to provide wireless assistance exists in the network, the network node transmits, in broadcast mode, the assistance request information to all mobile access points in the network. In other implementation manners, the network node may also select any one of a unicast mode, a multicast mode, or a broadcast mode according to a specific situation to transmit the assistance request information to the mobile access point. For example, when the network node does not know the quantity of mobile access points in the network, the network node uses the broadcast mode to transmit the assistance request information to all mobile access points in the network; when the network node obtains the quantity of mobile access points in the network, the network node uses different modes according to the quantity of mobile access points to transmit the assistance request information to the mobile access points, so as to save transmission resources. For example, when the network node obtains that there is only one or two mobile access points in the network, the network node transmits the assistance request information to the mobile access points in unicast mode. When the network node obtains that there are three mobile access points in the network, the network node transmits the assistance request information to the mobile access points in multicast mode. When the network node obtains that there are at least four mobile access points in the network, the network node transmits the assistance request information to the mobile access points in broadcast mode. The network node may query the quantity of mobile access points in the network by broadcast, or may determine the quantity of mobile access points according to information transmitted by the mobile access points in advance, where the specific method is not limited.

It may be understood that, the assistance request information further includes one or a combination of the following: a device capability parameter, a time parameter, an effectiveness parameter, or a device name.

The device capability parameter is used to indicate a capability requirement (for example, hardware configurations supported by the network node such as an access mode, access bandwidth, a backhaul mode, a backhaul rate, a battery standby time, and a chip processing speed, and supported software configurations such as functions) that the mobile access point that provides wireless assistance needs to meet. Only a mobile access point that meets the device capability parameter is qualified to provide wireless assistance for an access device that transmits assistance request information.

The time parameter is used to indicate a start time and an end time at which wireless assistance needs to be provided for the access device, where a difference between the end time and the start time is a valid time, so that the mobile access point can estimate, according to the time parameter, a response time required for arriving at the location at which wireless assistance needs to be provided, and a valid time within which wireless assistance needs to be provided, and therefore can determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The effectiveness parameter is a priority parameter or an assistance effectiveness parameter. The priority parameter is used to indicate a priority of an assistance request, so that the mobile access point can determine, according to the priority of the assistance request, a sequence of responding to the assistance request corresponding to the priority. The assistance effectiveness parameter is used to indicate an assistance effectiveness indicator of the assistance request. The assistance effectiveness indicator is a parameter for measuring network performance enhanced by the mobile access point, for example, a largest capacity, a moving speed, and a delay of the mobile access point. The mobile access point can further determine the assistance effectiveness indicator of the assistance request according to the assistance effectiveness indicator. Wireless assistance is provided only when the mobile access point determines that the assistance effectiveness indicator of the assistance request is higher than an assistance effectiveness indicator of a currently provided wireless access service.

The device name is a network identifier or a service set identifier. The network identifier is used to indicate a network identifier that should be used when the mobile access point that provides wireless assistance for the access device provides a wireless service, for example, a WiFi network; the service set identifier is used to indicate a service set identifier that should be used when the mobile access point that provides wireless assistance for the access device provides a wireless service for the access device, for example, CMCC.

The quantity of mobile access points in the network may be one or may be at least two.

S703. Receive assistance response information transmitted by the at least one mobile access point, where the assistance response information includes a mobile access point identifier, where the mobile access point identifier represents a mobile access point that can perform wireless assistance.

The network node receives assistance response information transmitted by the at least one mobile access point, where the assistance response information includes a mobile access point identifier, where the mobile access point identifier represents a mobile access point that can perform wireless assistance.

For example, when the at least one mobile access point receives the assistance request information, determines, according to parameters such as the information about the location at which wireless assistance is required, a current moving speed, and a moving path, that the mobile access point can move to the location at which wireless assistance is required, to provide wireless assistance for the access device that requires assistance, and transmits the assistance response information to the network node, the network node receives the assistance response information transmitted by the at least one mobile access point, determines, according to a message identifier in the assistance response information, that a mobile access point can provide wireless assistance, and identifies, according to the mobile access point identifier in the assistance response information, the mobile access point that can provide wireless assistance.

It may be understood that, the assistance response information received by the network node further includes one or a combination of the following: a device capability parameter, an operating status parameter, a time parameter, an effectiveness parameter, or an assistance request information sequence number.

For example, the assistance response information that is transmitted by the mobile access point that can provide wireless assistance and received by the network node further includes one or a combination of the following: a device capability parameter, an operating status parameter, a time parameter, an effectiveness parameter, or an assistance request information sequence number, so that the network node can determine, according to the received assistance response information, from the at least one mobile access point that can provide wireless assistance, the mobile access point that needs to perform wireless assistance. An operating status includes being idle, moving to the location at which wireless assistance needs to be provided, and providing a wireless traffic offload service; the effectiveness parameter is a priority parameter or an assistance effectiveness parameter.

The device capability parameter is used to indicate a capability of the mobile access point (for example, hardware configurations supported by the mobile access point such as an access mode, access bandwidth, a backhaul mode, a backhaul rate, a battery standby time, and a chip processing speed, and supported software configurations such as functions), so that the network node can select, according to the device capability parameter, from the mobile access points that can provide wireless assistance, a mobile access point that can better meet the capability requirement of the access device that requires assistance, to provide wireless assistance.

The operating status parameter is used to indicate a current operating status of the mobile access point, so that the network node can preferentially select, according to the current operating status of the mobile access point, a mobile access point that is in an idle state, to provide wireless assistance.

The time parameter is used to indicate the time required by the mobile access point to arrive at the location at which wireless assistance needs to be provided, to provide a wireless traffic offload service, so that the network node can compare the time parameter with the valid time within which wireless assistance needs to be provided for the access device, so as to select, from the mobile access points that can provide wireless assistance, a mobile access point that can more quickly arrive at the location at which wireless assistance needs to be provided, to provide wireless assistance.

When the effectiveness parameter is a priority parameter, the network node can identify, according to the priority parameter, a priority of wireless assistance currently provided by the mobile access point, or identify a difference between a priority of wireless assistance currently provided by the mobile access point and a priority indicated in the assistance request information, and therefore can select, from the mobile access points that can provide wireless assistance, a mobile access point that can preferentially respond to the assistance request information, to provide wireless assistance.

When the effectiveness parameter is an assistance effectiveness parameter, the network node can identify, according to the assistance effectiveness parameter, an assistance effectiveness indicator of wireless assistance currently provided by the mobile access point, or identify a difference between an assistance effectiveness indicator of wireless assistance currently provided by the mobile access point and an assistance effectiveness indicator indicated in the assistance request information. The assistance effectiveness indicator is a parameter for measuring network performance enhanced by the mobile access point, for example, a largest capacity, a moving speed, and a delay of the mobile access point, and therefore can select, from the mobile access points that can provide wireless assistance, a mobile access point that has highest assistance effectiveness to provide wireless assistance.

The assistance request information sequence number is used to indicate a priority of an assistance request corresponding to the assistance response information, so that the network node can further identify, according to the assistance request information sequence number, the priority of the assistance request corresponding to the assistance response information, and therefore can select a mobile access point with a high priority to provide wireless assistance.

S704. Determine, according to the assistance response information, from the at least one mobile access point, a mobile access point that needs to perform wireless assistance.

The network node determines, according to the assistance response information, from the at least one mobile access point, the mobile access point that needs to perform wireless assistance. For example, when the network node receives the assistance response information, the network node determines, according to the message identifier in the assistance response information, that a mobile access point can provide wireless assistance, and identifies, according to the mobile access point identifier in the assistance response information, the mobile access point that can provide wireless assistance. The network node determines, according to parameters in the assistance response information transmitted by each mobile access point, from the at least one mobile access point, a mobile access point that needs to perform wireless assistance.

A quantity of mobile access points that need to perform wireless assistance is decided according to a specific situation of network status information. For example, the quantity is decided according to a user quantity, requested bandwidth, data traffic, or a service requirement.

The network node determines, from the at least one mobile access point that can provide wireless assistance, the mobile access point that needs to perform wireless assistance. A followed principle may be: preferentially selecting a mobile access point currently in an idle state to provide wireless assistance, and when there are multiple mobile access points currently in idle states, selecting, according to the capability parameter of each mobile access point, the priority parameter or assistance effectiveness parameter of the currently provided service, and the priority parameter or assistance effectiveness parameter of the wireless assistance, a mobile access point that provides wireless assistance and can better meet the capability requirement of the access device requiring assistance and can more quickly arrive at the location at which wireless assistance needs to be provided, to provide wireless assistance. In other implementation manners, other selection principles may be followed, which is decided according to an actual situation.

For example, the network node identifies the capability of the mobile access point according to the device capability parameter in the assistance response information, and selects, from the mobile access points that can provide wireless assistance, a mobile access point that can better meet the capability requirement of the access device that requires assistance, to provide wireless assistance.

The network node identifies the current operating status of the mobile access point according to the operating status parameter in the assistance response information, and preferentially selects a mobile access point that is in an idle state, to provide wireless assistance.

The network node identifies, according to the time parameter in the assistance response information, the time required by the mobile access point to arrive at the location at which wireless assistance needs to be provided, to provide a wireless traffic offload service, compares the time parameter with the valid time within which wireless assistance needs to be provided for the access device, and selects, from the mobile access points that can provide wireless assistance, a mobile access point that can more quickly arrive at the location at which wireless assistance needs to be provided, to provide wireless assistance.

The network node identifies, according to the effectiveness parameter in the assistance response information, the priority of wireless assistance currently provided by the mobile access point, or identifies the difference between the priority of wireless assistance currently provided by the mobile access point and the priority indicated in the assistance request information, and selects, from the mobile access points that can provide wireless assistance, a mobile access point that can preferentially respond to the assistance request information, to provide wireless assistance.

The network node identifies, according to the effectiveness parameter in the assistance response information, the assistance effectiveness indicator of wireless assistance currently provided by the mobile access point, or identifies the difference between the assistance effectiveness indicator of wireless assistance currently provided by the mobile access point and the assistance effectiveness indicator indicated in the assistance request information, and selects, from the mobile access points that can provide wireless assistance, the mobile access point that has highest assistance effectiveness to provide wireless assistance.

The network node identifies, according to the assistance request information sequence number in the assistance response information, the priority of the assistance request corresponding to the assistance response information, and selects a mobile access point with a high priority to provide wireless assistance.

S705. Transmit assistance command information to the mobile access point, where the assistance command information is information for instructing the mobile access point to perform wireless assistance.

After the network node determines that the mobile access point that needs to perform wireless assistance provides wireless assistance for the access device that requires assistance, the network node transmits the assistance command information to the determined mobile access point, so that the mobile access point can obtain, according to the received assistance command information, the location of the access device that requires assistance, and move to the target location. The assistance command information is information for instructing the mobile access point to perform wireless assistance.

It may be understood that, the assistance command information further includes one or a combination of the following: a mobile access point identifier, a device name, or an assistance request information sequence number.

The mobile access point identifier is used to indicate the mobile access point that needs to perform wireless assistance, so that the selected mobile access point can determine, according to the mobile access point identifier in the assistance command information, whether the mobile access point is the selected mobile access point, and when a determining result is yes, move to the location at which wireless assistance can be provided for the access device that requires assistance, to provide a wireless traffic offload service, or otherwise, consider that incorrect assistance command information is received and perform no processing.

The device name is used to indicate a device name that should be used by the mobile access point that needs to perform wireless assistance, when the mobile access point provides a wireless service. Therefore, the device name used when the mobile access point provides the wireless service keeps consistent with a device name used by the access device that requires assistance, and a wireless traffic offload service can be provided for the access device. When the device name is a network identifier, the selected mobile access point can identify, according to the network identifier in the assistance command information, a network identifier (for example, a WiFi network) that should be used when the mobile access point provides a wireless service. Therefore, the network identifier used when the mobile access point provides the wireless service keeps consistent with a network identifier used by the access device that requires assistance, and a wireless traffic offload service can be provided for the access device.

When the device name is a service set identifier, the selected mobile access point can determine, according to the service set identifier, a service set identifier (for example, CMCC) that should be used when the mobile access point provides a wireless service. Therefore, the service set identifier used when the mobile access point provides the wireless service keeps consistent with a service set identifier used by the access device that requires assistance, and a wireless traffic offload service can be provided for the access device.

The assistance request information sequence number is used to indicate the priority of the assistance request corresponding to the assistance response information, so that the network node can identify, according to the assistance request information sequence number in the assistance command information, the priority of the assistance request corresponding to the assistance response information. Therefore, the mobile access point can preferentially respond to an assistance request with a high priority according to priorities of assistance requests.

S706. Control, according to assistance status information, the mobile access point that is performing wireless assistance.

When the mobile access point moves to the target location according to the assistance command information, and transmits the assistance status information to the network node, the network node obtains the assistance status information in the network status information, and controls, according to the assistance status information, the mobile access point that is performing wireless assistance. The assistance status information is one or a combination of a location parameter, a time parameter, or an event identifier of the mobile access point that is moving to the location of the access device that requires assistance.

The location parameter is used to indicate a current location of the mobile access point, so that the network node can determine, according to the location parameter in the assistance status information, the current location of the mobile access point or a difference from a location in an assistance status report that is transmitted previously, and therefore can determine, according to the location parameter, a remaining time required by the mobile access point to arrive at the target location to provide an assistance service.

The time parameter is used to indicate the remaining time required by the mobile access point to arrive at the target location to provide an assistance service, so that the network node can determine, according to the time parameter in the assistance status information, the remaining time required by the mobile access point to arrive at the target location to provide the assistance service.

The event identifier is used to indicate an event that occurs when the mobile access point moves to the target location, for example, an event such as blocking of moving, changing of a moving path, or detection of a radio signal of the device that requires assistance, so that the network node can determine, according to the event identifier in the assistance status information, the event that occurs during moving of the mobile access point to the target location, and therefore can determine, according to the event that occurs, the remaining time required by the mobile access point to arrive at the target location to provide the assistance service.

The network node identifies, according to a message identifier in the assistance status information, that the mobile access point has transmitted the assistance status information, and estimates, according to the assistance status information, the remaining time required by the mobile access point to arrive at the location at which wireless assistance needs to be provided.

The network node determines, according to the location parameter in the assistance status information, the current location of the mobile access point or the difference from the location in the assistance status report transmitted previously, and therefore determines, according to the location parameter, the remaining time required by the mobile access point to arrive at the target location to provide the assistance service.

The network node determines, according to the time parameter in the assistance status information, the remaining time required by the mobile access point to arrive at the target location to provide the assistance service.

The network node determines, according to the event identifier in the assistance status information, the event (for example, an event such as blocking of moving, changing of a moving path, or detection of a radio signal of the device that requires assistance) that occurs during moving of the mobile access point to the target location, and therefore determines, according to the event that occurs, the remaining time required by the mobile access point to arrive at the target location to provide the assistance service.

After the network node estimates, according to the assistance status information, the remaining time required by the mobile access point to arrive at the location at which wireless assistance needs to be provided, the network node compares the estimated time with the valid time within which wireless assistance needs to be provided for the access device.

When the remaining time estimated by the network node is in the valid time within which wireless assistance needs to be provided, the network node determines that the mobile access point can arrive, as expected, at the location at which wireless assistance needs to be provided. The network node allows the mobile access point to continue to move to the target location, until the mobile access point moves to the location at which wireless assistance can be provided for the access device that requires assistance, so as to provide a wireless traffic offload service in a wireless manner for the access device that requires assistance.

When there is only one mobile access point in the network, and when the remaining time estimated by the network node is not in the valid time within which wireless assistance needs to be provided, the network node determines that the mobile access point cannot arrive, as expected, at the location at which wireless assistance needs to be provided, and abandons the wireless assistance request.

When there are at least two mobile access points in the network, and when the remaining time estimated by the network node is not in the valid time within which wireless assistance needs to be provided, the network node determines that the mobile access point cannot arrive, as expected, at the location at which wireless assistance needs to be provided, and abandons the wireless assistance request, then re-determines, from mobile access points that can provide wireless assistance, a mobile access point that needs to perform wireless assistance to provide wireless assistance, and therefore dynamically adjusts the mobile access point that can provide wireless assistance, to provide wireless assistance.

In the foregoing solution, a network node obtains network status information, determines, according to the network status information, a mobile access point that needs to perform wireless assistance, and transmits assistance command information to the mobile access point that needs to perform wireless assistance, so that the mobile node moves, according to the assistance command information, to a location at which wireless assistance can be provided for an access device that requires assistance. Therefore, according to the network status information, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for a user.

When at least two mobile access points in the network can provide wireless assistance for the access device that requires assistance, the network node may further select a most suitable mobile access point from the mobile access points to provide wireless assistance.

A time required by the mobile access point to arrive at the location at which wireless assistance needs to be provided can be estimated more accurately according to an assistance status report transmitted by the mobile access point, and therefore, the mobile access point that can provide wireless assistance is dynamically adjusted to provide wireless assistance.

Figure 8:
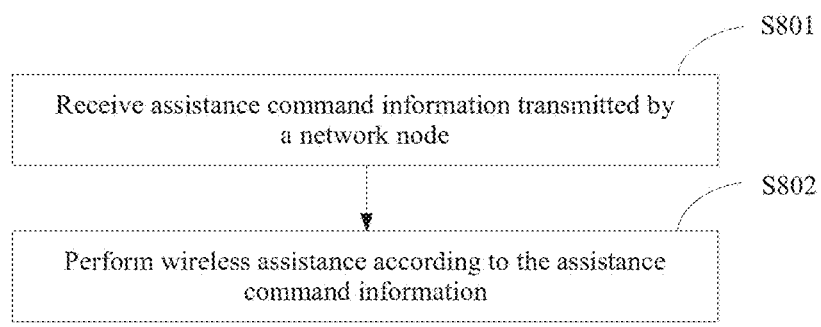
FIG. 8 is a flowchart of a fifth implementation manner of a wireless assistance method according to this application.

Referring to FIG. 8, FIG. 8 is a flowchart of a fifth implementation manner of a wireless assistance method according to this application. This implementation manner is described from a perspective of a mobile access point. This implementation manner includes the following steps.

S801. Receive assistance command information transmitted by a network node.

A mobile access point receives assistance command information transmitted by a network node. The mobile access point is an access point that can move. The network node is user equipment, an access device, or a control device. Wireless assistance means that a wireless traffic offload service is provided for an access device that requires assistance.

For example, when the network node determines a mobile access point that needs to perform wireless assistance, and transmits an assistance command to the mobile access point in a network, the mobile access point receives assistance command information transmitted by the network node. The assistance command information is information for instructing the mobile access point to perform wireless assistance, and the assistance command information includes at least a message identifier and a location identifier, where the location identifier is a device identifier or a location parameter. The message identifier is used to indicate that the information is assistance command information, so that the mobile access point can determine, according to the message identifier, that the access device that requires the mobile access point to provide wireless assistance exists in the network. The location identifier is used to indicate a location of the access device that requires the mobile access point to provide wireless assistance, so that the mobile access point can identify, according to the location identifier, the location of the access device that requires the mobile access point to provide wireless assistance.

A quantity of mobile access points in the network may be one or may be at least two.

S802. Perform wireless assistance according to the assistance command information.

The mobile access point performs wireless assistance according to the assistance command information. For example, after receiving the assistance command information, the mobile access point determines, according to the message identifier in the assistance command information, that the network node allows the mobile access point to provide wireless assistance, and identifies, according to the location identifier in the assistance command information, the location of the access device that requires the mobile access point to provide wireless assistance. The location identifier is a device identifier or a location parameter. When the location identifier is a device identifier, the access device that requires assistance is identified according to the device identifier, so that the location of the access device is found. When the location identifier is a location parameter, a target location at which the mobile access point needs to provide wireless assistance is identified according to the location parameter.

A method for obtaining the location of the access device by the mobile access point may be obtaining the location by querying a locally stored table of mappings between device identifiers and locations. When the device identifier is not stored locally, information may also be transmitted to a node (for example, an access controller or a server) that provides a location query service in the network, so that location information corresponding to the device identifier is queried; in addition, the device identifier and the location information corresponding to the device identifier are stored in the local table of mappings between device identifiers and locations, so that the mobile access point can perform a query locally.

After the mobile access point obtains the location of the access device that requires assistance, the mobile access point moves to the target location, and moves to the location at which wireless assistance can be provided for the access device that requires assistance. Therefore, a wireless traffic offload service is provided in a wireless manner for the access device that requires assistance.

In the foregoing solution, a mobile access point receives a wireless assistance command transmitted by a network node, and moves, according to the wireless assistance command, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

Figure 9:
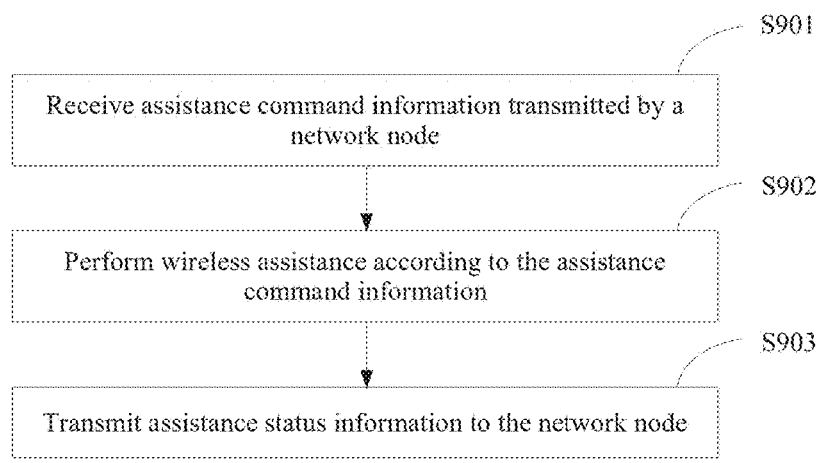
FIG. 9 is a flowchart of a sixth implementation manner of a wireless assistance method according to this application.

Referring to FIG. 9, FIG. 9 is a flowchart of a sixth implementation manner of a wireless assistance method according to this application. This implementation manner is described from a perspective of a mobile access point. This implementation manner includes the following steps.

S901. Receive assistance command information transmitted by a network node.

A mobile access point receives assistance command information transmitted by a network node. The mobile access point is an access point that can move. The network node is user equipment, an access device, or a control device. Wireless assistance means that a wireless traffic offload service is provided for an access device that requires assistance.

For example, when the network node determines a mobile access point that needs to perform wireless assistance, and transmits an assistance command to the mobile access point in a network, the mobile access point receives assistance command information transmitted by the network node. The assistance command information is information for instructing the mobile access point to perform wireless assistance, and the assistance command information includes at least a message identifier and a location identifier, where the location identifier is a device identifier or a location parameter. The message identifier is used to indicate that the information is assistance command information, so that the mobile access point can determine, according to the message identifier, that the access device that requires the mobile access point to provide wireless assistance exists in the network. The location identifier is used to indicate a location of the access device that requires the mobile access point to provide wireless assistance, so that the mobile access point can identify, according to the location identifier, the location of the access device that requires the mobile access point to provide wireless assistance.

A quantity of mobile access points in the network may be one or may be at least two.

S902. Perform wireless assistance according to the assistance command information.

The mobile access point performs wireless assistance according to the assistance request information.

For example, after receiving the assistance command information, the mobile access point determines, according to the message identifier in the assistance command information, that the network node allows the mobile access point to provide wireless assistance, and identifies, according to the location identifier in the assistance command information, the location of the access device that requires the mobile access point to provide wireless assistance. The location identifier is a device identifier or a location parameter. When the location identifier is a device identifier, the access device that requires assistance is identified according to the device identifier, so that the location of the access device is found. When the location identifier is a location parameter, a target location at which the mobile access point needs to provide wireless assistance is identified according to the location parameter.

A method for obtaining the location of the access device by the mobile access point may be obtaining the location by querying a locally stored table of mappings between device identifiers and locations. When the device identifier is not stored locally, information may also be transmitted to a node (for example, an access controller or a server) that provides a location query service in the network, so that location information corresponding to the device identifier is queried; in addition, the device identifier and the location information corresponding to the device identifier are stored in the local table of mappings between device identifiers and locations, so that the mobile access point can perform a query locally.

After the mobile access point obtains the location of the access device that requires assistance, the mobile access point moves to the target location, and moves to the location at which wireless assistance can be provided for the access device that requires assistance. Therefore, a wireless traffic offload service is provided in a wireless manner for the access device that requires assistance.

S903. Transmit assistance status information to the network node, where the assistance status information includes one or a combination of a location parameter, a time parameter, or an event identifier.

When the mobile access point moves to the target location according to the assistance command information, the mobile access point transmits assistance status information to the network node, so that after the network node obtains the assistance status information in network status information, the network node can identify, according to a message identifier in the assistance status information, that the mobile access point has transmitted the assistance status information, and can estimate, according to the assistance status information, a remaining time required by the mobile access point to arrive at the location at which wireless assistance needs to be provided, and control, according to the required remaining time, the mobile access point to perform wireless assistance. The assistance status information is one or a combination of a location parameter, a time parameter, or an event identifier of the mobile access point that is performing wireless assistance.

The location parameter is used to indicate a current location of the mobile access point that is moving to the location of the access device that requires assistance, so that when the network node obtains the assistance status information in the network status information, the network node can determine, according to the location parameter in the assistance status information, the current location of the mobile access point or a difference from a location in an assistance status report that is transmitted previously, and therefore can determine, according to the location parameter, the remaining time required by the mobile access point to arrive at the target location to provide an assistance service.

The time parameter is used to indicate the remaining time required by the mobile access point to arrive at the target location to provide an assistance service, so that when the network node obtains the assistance status information in the network status information, the network node can determine, according to the time parameter in the assistance status information, the remaining time required by the mobile access point to arrive at the target location to provide the assistance service.

The event identifier is used to indicate an event that occurs when the mobile access point moves to the target location, for example, an event such as blocking of moving, changing of a moving path, or detection of a radio signal of the device that requires assistance, so that when the network node obtains the assistance status information in the network status information, the network node can determine, according to the event identifier in the assistance status information, the event that occurs during moving of the mobile access point to the target location, and therefore can determine, according to the event that occurs, the remaining time required by the mobile access point to arrive at the target location to provide the assistance service.

In the foregoing solution, a mobile access point receives a wireless assistance command transmitted by a network node, and moves, according to the wireless assistance command, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

The mobile access point transmits assistance status information to the network node when moving to the target location, so that the network node can estimate more accurately, according to an assistance status report transmitted by the mobile access point, a time required by the mobile access point to arrive at the location at which wireless assistance needs to be provided. Therefore, the mobile access point that can provide wireless assistance is dynamically adjusted to provide wireless assistance.

In the foregoing solution, a mobile access point receives a wireless assistance command transmitted by a network node, and moves, according to the wireless assistance command, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

The mobile access point transmits assistance status information to the network node when moving to the target location, so that the network node can estimate more accurately, according to an assistance status report transmitted by the mobile access point, a time required by the mobile access point to arrive at the location at which wireless assistance needs to be provided. Therefore, the mobile access point that can provide wireless assistance is dynamically adjusted to provide wireless assistance.

Figure 10:
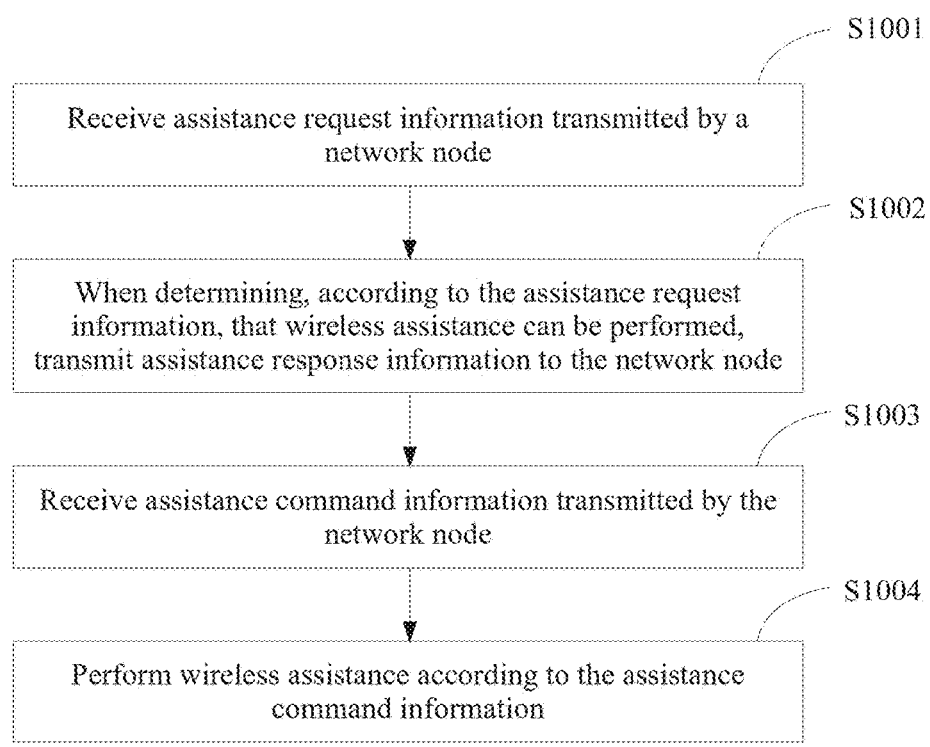
FIG. 10 is a flowchart of a seventh implementation manner of a wireless assistance method according to this application.

Referring to FIG. 10, FIG. 10 is a flowchart of a seventh implementation manner of a wireless assistance method according to this application. This implementation manner is described from a perspective of a mobile access point. This implementation manner includes the following steps.

S1001. Receive assistance request information transmitted by the network node, where the assistance request information includes information about a location at which wireless assistance is required.

A mobile access point receives assistance request information transmitted by a network node, where the assistance request information includes information about a location at which wireless assistance is required. For example, when the network node determines a mobile access point that needs to perform wireless assistance, and transmits assistance request information to at least one mobile access point, the mobile access point receives the assistance request information transmitted by the network node. The assistance request information includes the information about the location at which wireless assistance is required.

It may be understood that, the assistance request information further includes one or a combination of the following: a device capability parameter, a time parameter, an effectiveness parameter, or a device name. For example, the assistance request information transmitted by the network node further includes one or a combination of the following: a device capability parameter, a time parameter, an effectiveness parameter, or a device name.

The device capability parameter is used to indicate a capability requirement (for example, hardware configurations supported by the network node such as an access mode, access bandwidth, a backhaul mode, a backhaul rate, a battery standby time, and a chip processing speed, and supported software configurations such as functions) that the mobile access point that provides wireless assistance needs to meet. Only a mobile access point that meets the device capability parameter is qualified to provide wireless assistance for an access device that transmits assistance request information.

The time parameter is used to indicate a start time and an end time at which wireless assistance needs to be provided for the access device, where a difference between the end time and the start time is a valid time, so that the mobile access point can estimate, according to the time parameter, a response time required for arriving at the location at which wireless assistance needs to be provided, and a valid time within which wireless assistance needs to be provided, and therefore can determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The effectiveness parameter is a priority parameter or an assistance effectiveness parameter. The priority parameter is used to indicate a priority of an assistance request, so that the mobile access point can determine, according to the priority of the assistance request, a sequence of responding to the assistance request corresponding to the priority. The assistance effectiveness parameter is used to indicate an assistance effectiveness indicator of the assistance request. The assistance effectiveness indicator is a parameter for measuring network performance enhanced by the mobile access point, for example, a largest capacity, a moving speed, and a delay of the mobile access point. The mobile access point can further determine the assistance effectiveness indicator of the assistance request according to the assistance effectiveness indicator. Wireless assistance is provided only when the mobile access point determines that the assistance effectiveness indicator of the assistance request is higher than an assistance effectiveness indicator of a currently provided wireless access service.

The device name is a network identifier or a service set identifier. The network identifier is used to indicate a network identifier that should be used when the mobile access point that provides wireless assistance for the access device provides a wireless service, for example, a WiFi network; the service set identifier is used to indicate a service set identifier that should be used when the mobile access point that provides wireless assistance for the access device provides a wireless service for the access device, for example, CMCC.

S1002. When determining, according to the assistance request information, that wireless assistance can be performed, transmit assistance response information to the network node, where the assistance response information includes a mobile access point identifier.

The mobile access point determines, according to the assistance request information, whether wireless assistance can be performed. When the mobile access point determines that wireless assistance can be performed, the mobile access point transmits assistance response information to the network node, where the assistance response information includes a mobile access point identifier. For example, when the mobile access point receives the assistance request information, the mobile access point determines, according to a message identifier in the assistance request information, whether the access device that requires the mobile access point to provide wireless assistance exists in the network, identifies, according to a location parameter in the assistance request information, a device identifier of the access device that requires the mobile access point to provide wireless assistance, and determines a location of the access device according to the device identifier of the access device.

After the mobile access point determines the location of the access device that needs to be provided with wireless assistance, the mobile access point determines, according to parameters such as the location of the access device that needs to be provided with wireless assistance, a current moving speed, and a moving path, whether the mobile access point can move, within the valid time within which wireless assistance needs to be provided, to the location at which wireless assistance can be provided for the access device that requires assistance, to perform wireless assistance.

It may be understood that, the mobile access point may further determine, according to the device capability parameter in the assistance request information, whether the mobile access point meets the capability requirement required for providing wireless assistance for the access device that requires assistance. When the mobile access point determines that the mobile access point meets the device capability parameter, the mobile access point is qualified to provide wireless assistance for the access device that transmits the assistance request information.

The mobile access point may further estimate, according to the time parameter in the assistance request information, the response time required for arriving at the location at which wireless assistance needs to be provided, and the valid time within which wireless assistance needs to be provided, and determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The mobile access point may further identify, according to the priority parameter in the assistance request information, the priority corresponding to the assistance request, and determine, according to the priority corresponding to the assistance request, the sequence of responding to the assistance request corresponding to the priority. The mobile access point may further identify, according to the assistance effectiveness parameter in the assistance request information, the assistance effectiveness parameter of the assistance request, determine the assistance effectiveness indicator of the assistance request according to the assistance effectiveness indicator, and provide wireless assistance only when the mobile access point determines that the assistance effectiveness indicator of the assistance request is higher than the assistance effectiveness indicator of the currently provided wireless access service.

The mobile access point may further identify, according to the device name in the assistance request information, the network identifier (for example, a WiFi network) or the service set identifier (for example, CMCC) that should be used when the mobile access point that provides wireless assistance for the access device provides the wireless service.

When the mobile access point determines that the mobile access point can move, within the valid time within which wireless assistance needs to be provided, to the location at which wireless assistance can be provided for the access device that requires assistance, to perform wireless assistance, the mobile access point transmits assistance response information to the network node. The assistance response information includes at least a mobile access point identifier, so that the network node can identify, according to the mobile access point identifier in the assistance response information, the mobile access point that can provide wireless assistance.

It may be understood that, the assistance response information further includes one or a combination of the following: a device capability parameter, an operating status parameter, a time parameter, an effectiveness parameter, or an assistance request information sequence number.

For example, the assistance response information transmitted by the mobile access point further includes one or a combination of the following: a device capability parameter, an operating status parameter, a time parameter, an effectiveness parameter, or an assistance request information sequence number. Therefore, the network node can determine, according to the received assistance response information, from the at least one mobile access point that can provide wireless assistance, the mobile access point that needs to perform wireless assistance. An operating status includes being idle, moving to the location at which wireless assistance needs to be provided, and providing a wireless traffic offload service; the effectiveness parameter is a priority parameter or an assistance effectiveness parameter.

The device capability parameter is used to indicate a capability of the mobile access point (for example, hardware configurations supported by the mobile access point such as an access mode, access bandwidth, a backhaul mode, a backhaul rate, a battery standby time, and a chip processing speed, and supported software configurations such as functions), so that the network node can select, according to the device capability parameter, from the mobile access points that can provide wireless assistance, a mobile access point that can better meet the capability requirement of the access device that requires assistance, to provide wireless assistance.

The operating status parameter is used to indicate a current operating status of the mobile access point, so that the network node can preferentially select, according to the current operating status of the mobile access point, a mobile access point that is in an idle state, to provide wireless assistance.

The time parameter is used to indicate the time required by the mobile access point to arrive at the location at which wireless assistance needs to be provided, to provide a wireless traffic offload service, so that the network node can compare the time parameter with the valid time within which wireless assistance needs to be provided for the access device, so as to select, from the mobile access points that can provide wireless assistance, a mobile access point that can more quickly arrive at the location at which wireless assistance needs to be provided, to provide wireless assistance.

When the effectiveness parameter is a priority parameter, the network node can identify, according to the priority parameter, a priority of wireless assistance currently provided by the mobile access point, or identify a difference between a priority of wireless assistance currently provided by the mobile access point and a priority indicated in the assistance request information, and therefore can select, from the mobile access points that can provide wireless assistance, a mobile access point that can preferentially respond to the assistance request information, to provide wireless assistance.

When the effectiveness parameter is an assistance effectiveness parameter, the network node can identify, according to the assistance effectiveness parameter, an assistance effectiveness indicator of wireless assistance currently provided by the mobile access point, or identify a difference between an assistance effectiveness indicator of wireless assistance currently provided by the mobile access point and an assistance effectiveness indicator indicated in the assistance request information. The assistance effectiveness indicator is a parameter for measuring network performance enhanced by the mobile access point, for example, a largest capacity, a moving speed, and a delay of the mobile access point, and therefore can select, from the mobile access points that can provide wireless assistance, a mobile access point that has highest assistance effectiveness to provide wireless assistance.

The assistance request information sequence number is used to indicate a priority of an assistance request corresponding to the assistance response information, so that the network node can further identify, according to the assistance request information sequence number, the priority of the assistance request corresponding to the assistance response information, and therefore can select a mobile access point with a high priority to provide wireless assistance.

S1003. Receive assistance command information transmitted by the network node.

When the network node receives the assistance response information transmitted by the at least one mobile access point, determines, according to the assistance response information, from the at least one mobile access point that can provide wireless assistance, the mobile access point that needs to perform wireless assistance, and transmits the assistance command information to the mobile access point, the mobile access point receives the assistance command information transmitted by the network node.

S1004. Perform wireless assistance according to the assistance command information.

The mobile access point moves, according to the assistance command information, to the location at which wireless assistance can be provided for the access device that requires assistance. Therefore, a wireless traffic offload service is provided in a wireless manner for the access device that requires assistance.

For example, after receiving the assistance command information, the mobile access point determines, according to a message identifier in the assistance command information, that the network node allows the mobile access point to provide wireless assistance, and identifies, according to a location identifier in the assistance command information, the location of the access device that requires the mobile access point to provide wireless assistance. The location identifier is a device identifier or a location parameter. When the location identifier is a device identifier, the access device that requires assistance is identified according to the device identifier, so that the location of the access device is found. When the location identifier is a location parameter, a target location at which the mobile access point needs to provide wireless assistance is identified according to the location parameter.

A method for obtaining the location of the access device by the mobile access point may be obtaining the location by querying a locally stored table of mappings between device identifiers and locations. When the device identifier is not stored locally, information may also be transmitted to a node (for example, an access controller or a server) that provides a location query service in the network, so that location information corresponding to the device identifier is queried; in addition, the device identifier and the location information corresponding to the device identifier are stored in the local table of mappings between device identifiers and locations, so that the mobile access point can perform a query locally.

After the mobile access point obtains the location of the access device that requires assistance, the mobile access point moves to the target location, and moves to the location at which wireless assistance can be provided for the access device that requires assistance. Therefore, a wireless traffic offload service is provided in a wireless manner for the access device that requires assistance.

It may be understood that, the assistance command information further includes one or a combination of the following: a mobile access point identifier, a device name, or an assistance request information sequence number. For example, when the network node determines, according to the assistance response information, from the at least one mobile access point that can provide wireless assistance, the mobile access point that needs to perform wireless assistance, and transmits the assistance command information to the mobile access point, the assistance command information received by the mobile access point further includes one or a combination of the following: a mobile access point identifier, a device name, or an assistance request information sequence number. An operating status includes being idle, moving to the location at which wireless assistance needs to be provided, and providing a wireless traffic offload service; the effectiveness parameter is a priority parameter or an assistance effectiveness parameter. Therefore, the mobile access point performs wireless assistance according to the assistance command information.

The mobile access point identifier is used to indicate the mobile access point that needs to perform wireless assistance. The mobile access point determines, according to the mobile access point identifier in the assistance command information, whether the mobile access point is the selected mobile access point, and when a determining result is yes, controls the mobile access point to move to the location at which wireless assistance can be provided for the access device that requires assistance, to provide a wireless traffic offload service, or otherwise, considers that incorrect assistance command information is received and performs no processing.

The device name is used to indicate a device name that should be used by the mobile access point that needs to perform wireless assistance, when the mobile access point provides a wireless service. Therefore, the device name used when the mobile access point provides the wireless service keeps consistent with a device name used by the access device that requires assistance, and a wireless traffic offload service can be provided for the access device. When the mobile access point identifies, according to the assistance command information, that the device name is a network identifier, the mobile access point identifies, according to the network identifier in the assistance command information, a network identifier (for example, a WiFi network) that should be used when the mobile access point provides a wireless service. Therefore, the network identifier used when the mobile access point provides the wireless service keeps consistent with a network identifier used by the access device that requires assistance, and a wireless traffic offload service can be provided for the access device.

When the mobile access point identifies, according to the assistance command information, that the device name is a service set identifier, the mobile access point identifies, according to the service set identifier in the assistance command information, a service set identifier (for example, CMCC) that should be used when the mobile access point provides a wireless service. Therefore, the service set identifier used when the mobile access point provides the wireless service keeps consistent with a service set identifier used by the access device that requires assistance, and a wireless traffic offload service can be provided for the access device.

The assistance request information sequence number is used to indicate the priority of the assistance request corresponding to the assistance response information. The mobile access point identifies, according to the assistance request information sequence number in the assistance command information, the priority of the assistance request corresponding to the assistance response information, and therefore can preferentially respond to an assistance request with a high priority according to priorities of assistance requests.

In the foregoing solution, a mobile access point receives a wireless assistance command transmitted by a network node, and moves, according to the wireless assistance command, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

Figure 11:
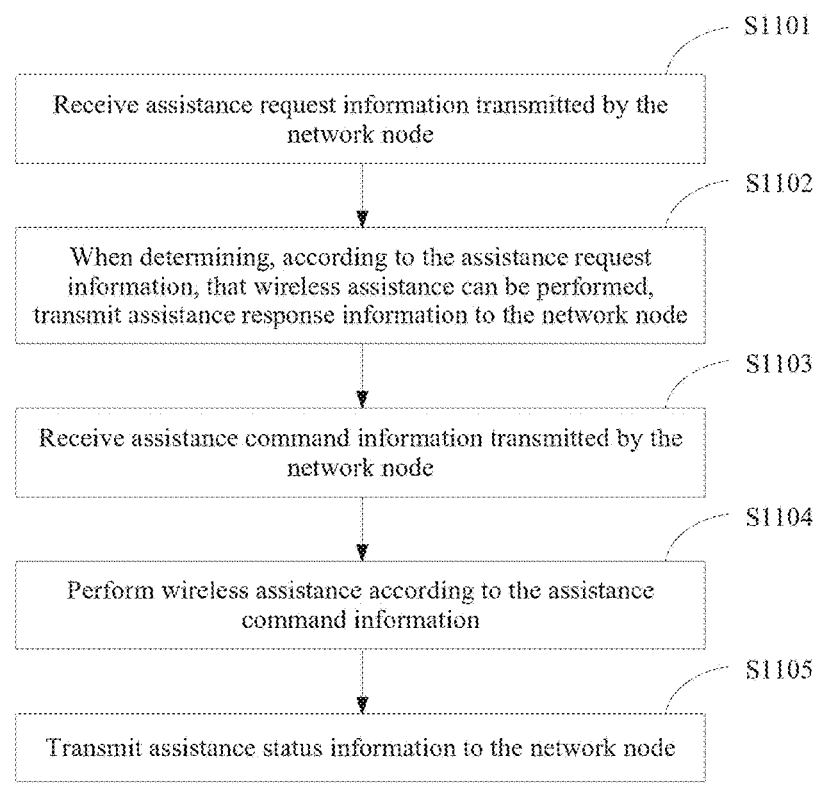
FIG. 11 is a flowchart of an eighth implementation manner of a wireless assistance method according to this application.

Referring to FIG. 11, FIG. 11 is a flowchart of an eighth implementation manner of a wireless assistance method according to this application. This implementation manner is described from a perspective of a mobile access point. This implementation manner includes the following steps.

S1101. Receive assistance request information transmitted by the network node, where the assistance request information includes information about a location at which wireless assistance is required.

A mobile access point receives assistance request information transmitted by a network node, where the assistance request information includes information about a location at which wireless assistance is required. For example, when the network node determines a mobile access point that needs to perform wireless assistance, and transmits assistance request information to at least one mobile access point, the mobile access point receives the assistance request information transmitted by the network node. The assistance request information includes the information about the location at which wireless assistance is required.

It may be understood that, the assistance request information further includes one or a combination of the following: a device capability parameter, a time parameter, an effectiveness parameter, or a device name. For example, the assistance request information transmitted by the network node further includes one or a combination of the following: a device capability parameter, a time parameter, an effectiveness parameter, or a device name.

The device capability parameter is used to indicate a capability requirement (for example, hardware configurations supported by the network node such as an access mode, access bandwidth, a backhaul mode, a backhaul rate, a battery standby time, and a chip processing speed, and supported software configurations such as functions) that the mobile access point that provides wireless assistance needs to meet. Only a mobile access point that meets the device capability parameter is qualified to provide wireless assistance for an access device that transmits assistance request information.

The time parameter is used to indicate a start time and an end time at which wireless assistance needs to be provided for the access device, where a difference between the end time and the start time is a valid time, so that the mobile access point can estimate, according to the time parameter, a response time required for arriving at the location at which wireless assistance needs to be provided, and a valid time within which wireless assistance needs to be provided, and therefore can determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The effectiveness parameter is a priority parameter or an assistance effectiveness parameter. The priority parameter is used to indicate a priority of an assistance request, so that the mobile access point can determine, according to the priority of the assistance request, a sequence of responding to the assistance request corresponding to the priority. The assistance effectiveness parameter is used to indicate an assistance effectiveness indicator of the assistance request. The assistance effectiveness indicator is a parameter for measuring network performance enhanced by the mobile access point, for example, a largest capacity, a moving speed, and a delay of the mobile access point. The mobile access point can further determine the assistance effectiveness indicator of the assistance request according to the assistance effectiveness indicator. Wireless assistance is provided only when the mobile access point determines that the assistance effectiveness indicator of the assistance request is higher than an assistance effectiveness indicator of a currently provided wireless access service.

The device name is a network identifier or a service set identifier. The network identifier is used to indicate a network identifier that should be used when the mobile access point that provides wireless assistance for the access device provides a wireless service, for example, a WiFi network; the service set identifier is used to indicate a service set identifier that should be used when the mobile access point that provides wireless assistance for the access device provides a wireless service for the access device, for example, CMCC.

S1102. When determining, according to the assistance request information, that wireless assistance can be performed, transmit assistance response information to the network node, where the assistance response information includes a mobile access point identifier.

The mobile access point determines, according to the assistance request information, whether wireless assistance can be performed. When the mobile access point determines that wireless assistance can be performed, the mobile access point transmits assistance response information to the network node, where the assistance response information includes a mobile access point identifier. For example, when the mobile access point receives the assistance request information, the mobile access point determines, according to a message identifier in the assistance request information, whether the access device that requires the mobile access point to provide wireless assistance exists in the network, identifies, according to a location parameter in the assistance request information, a device identifier of the access device that requires the mobile access point to provide wireless assistance, and determines a location of the access device according to the device identifier of the access device.

After the mobile access point determines the location of the access device that needs to be provided with wireless assistance, the mobile access point determines, according to parameters such as the location of the access device that needs to be provided with wireless assistance, a current moving speed, and a moving path, whether the mobile access point can move, within the valid time within which wireless assistance needs to be provided, to the location at which wireless assistance can be provided for the access device that requires assistance, to perform wireless assistance.

It may be understood that, the mobile access point may further determine, according to the device capability parameter in the assistance request information, whether the mobile access point meets the capability requirement required for providing wireless assistance for the access device that requires assistance. When the mobile access point determines that the mobile access point meets the device capability parameter, the mobile access point is qualified to provide wireless assistance for the access device that transmits the assistance request information.

The mobile access point may further estimate, according to the time parameter in the assistance request information, the response time required for arriving at the location at which wireless assistance needs to be provided, and the valid time within which wireless assistance needs to be provided, and determine, according to the response time, whether the mobile access point can move, within the valid time within which wireless assistance needs to be provided, to the location at which wireless assistance can be provided for the access device that requires assistance. When the response time is longer than the valid time, the mobile access point does not provide wireless assistance.

The mobile access point may further identify, according to the priority parameter in the assistance request information, the priority corresponding to the assistance request, and determine, according to the priority corresponding to the assistance request, the sequence of responding to the assistance request corresponding to the priority. The mobile access point may further identify, according to the assistance effectiveness parameter in the assistance request information, the assistance effectiveness parameter of the assistance request, determine the assistance effectiveness indicator of the assistance request according to the assistance effectiveness indicator, and provide wireless assistance only when the mobile access point determines that the assistance effectiveness indicator of the assistance request is higher than the assistance effectiveness indicator of the currently provided wireless access service.

The mobile access point may further identify, according to the device name in the assistance request information, the network identifier (for example, a WiFi network) or the service set identifier (for example, CMCC) that should be used when the mobile access point that provides wireless assistance for the access device provides the wireless service.

When the mobile access point determines that the mobile access point can move, within the valid time within which wireless assistance needs to be provided, to the location at which wireless assistance can be provided for the access device that requires assistance, to perform wireless assistance, the mobile access point transmits assistance response information to the network node. The assistance response information includes at least a mobile access point identifier, so that the network node can identify, according to the mobile access point identifier in the assistance response information, the mobile access point that can provide wireless assistance.

It may be understood that, the assistance response information further includes one or a combination of the following: a device capability parameter, an operating status parameter, a time parameter, an effectiveness parameter, or an assistance request information sequence number.

For example, the assistance response information transmitted by the mobile access point further includes one or a combination of the following: a device capability parameter, an operating status parameter, a time parameter, an effectiveness parameter, or an assistance request information sequence number. Therefore, the network node can determine, according to the received assistance response information, from the at least one mobile access point that can provide wireless assistance, the mobile access point that needs to perform wireless assistance. An operating status includes being idle, moving to the location at which wireless assistance needs to be provided, and providing a wireless traffic offload service; the effectiveness parameter is a priority parameter or an assistance effectiveness parameter.

The device capability parameter is used to indicate a capability of the mobile access point (for example, hardware configurations supported by the mobile access point such as an access mode, access bandwidth, a backhaul mode, a backhaul rate, a battery standby time, and a chip processing speed, and supported software configurations such as functions), so that the network node can select, according to the device capability parameter, from the mobile access points that can provide wireless assistance, a mobile access point that can better meet the capability requirement of the access device that requires assistance, to provide wireless assistance.

The operating status parameter is used to indicate a current operating status of the mobile access point, so that the network node can preferentially select, according to the current operating status of the mobile access point, a mobile access point that is in an idle state, to provide wireless assistance.

The time parameter is used to indicate the time required by the mobile access point to arrive at the location at which wireless assistance needs to be provided, to provide a wireless traffic offload service, so that the network node can compare the time parameter with the valid time within which wireless assistance needs to be provided for the access device, so as to select, from the mobile access points that can provide wireless assistance, a mobile access point that can more quickly arrive at the location at which wireless assistance needs to be provided, to provide wireless assistance.

When the effectiveness parameter is a priority parameter, the network node can identify, according to the priority parameter, a priority of wireless assistance currently provided by the mobile access point, or identify a difference between a priority of wireless assistance currently provided by the mobile access point and a priority indicated in the assistance request information, and therefore can select, from the mobile access points that can provide wireless assistance, a mobile access point that can preferentially respond to the assistance request information, to provide wireless assistance.

When the effectiveness parameter is an assistance effectiveness parameter, the network node can identify, according to the assistance effectiveness parameter, an assistance effectiveness indicator of wireless assistance currently provided by the mobile access point, or identify a difference between an assistance effectiveness indicator of wireless assistance currently provided by the mobile access point and an assistance effectiveness indicator indicated in the assistance request information. The assistance effectiveness indicator is a parameter for measuring network performance enhanced by the mobile access point, for example, a largest capacity, a moving speed, and a delay of the mobile access point, and therefore can select, from the mobile access points 120 that can provide wireless assistance, a mobile access point that has highest assistance effectiveness to provide wireless assistance.

The assistance request information sequence number is used to indicate a priority of an assistance request corresponding to the assistance response information, so that the network node can further identify, according to the assistance request information sequence number, the priority of the assistance request corresponding to the assistance response information, and therefore can select a mobile access point with a high priority to provide wireless assistance.

S1103. Receive assistance command information transmitted by the network node.

When the network node receives the assistance response information transmitted by the at least one mobile access point, determines, according to the assistance response information, from the at least one mobile access point that can provide wireless assistance, the mobile access point that needs to perform wireless assistance, and transmits the assistance command information to the mobile access point, the mobile access point receives the assistance command information transmitted by the network node.

S1104. Perform wireless assistance according to the assistance command information.

The mobile access point moves, according to the assistance command information, to the location at which wireless assistance can be provided for the access device that requires assistance, and moves to a target location.

For example, after receiving the assistance command information, the mobile access point determines, according to a message identifier in the assistance command information, that the network node allows the mobile access point to provide wireless assistance, and identifies, according to a location identifier in the assistance command information, the location of the access device that requires the mobile access point to provide wireless assistance. The location identifier is a device identifier or a location parameter. When the location identifier is a device identifier, the access device that requires assistance is identified according to the device identifier, so that the location of the access device is found. When the location identifier is a location parameter, a target location at which the mobile access point needs to provide wireless assistance is identified according to the location parameter.

A method for obtaining the location of the access device by the mobile access point may be obtaining the location by querying a locally stored table of mappings between device identifiers and locations. When the device identifier is not stored locally, information may also be transmitted to a node (for example, an access controller or a server) that provides a location query service in the network, so that location information corresponding to the device identifier is queried; in addition, the device identifier and the location information corresponding to the device identifier are stored in the local table of mappings between device identifiers and locations, so that the mobile access point can perform a query locally.

After the mobile access point obtains the location of the access device that requires assistance, the mobile access point moves to the target location.

It may be understood that, the assistance command information further includes one or a combination of the following: a mobile access point identifier, a device name, or an assistance request information sequence number. For example, when the network node determines, according to the assistance response information, from the at least one mobile access point that can provide wireless assistance, the mobile access point that needs to perform wireless assistance, and transmits the assistance command information to the mobile access point, the assistance command information received by the mobile access point further includes one or a combination of the following: a mobile access point identifier, a device name, or an assistance request information sequence number. An operating status includes being idle, moving to the location at which wireless assistance needs to be provided, and providing a wireless traffic offload service; the effectiveness parameter is a priority parameter or an assistance effectiveness parameter. Therefore, the mobile access point performs wireless assistance according to the assistance command information.

The mobile access point identifier is used to indicate the mobile access point that needs to perform wireless assistance. The mobile access point determines, according to the mobile access point identifier in the assistance command information, whether the mobile access point is the selected mobile access point, and when a determining result is yes, controls the mobile access point to move to the location at which wireless assistance can be provided for the access device that requires assistance, to provide a wireless traffic offload service, or otherwise, considers that incorrect assistance command information is received and performs no processing.

The device name is used to indicate a device name that should be used by the mobile access point that needs to perform wireless assistance, when the mobile access point provides a wireless service. Therefore, the device name used when the mobile access point provides the wireless service keeps consistent with a device name used by the access device that requires assistance, and a wireless traffic offload service can be provided for the access device. When the mobile access point identifies, according to the assistance command information, that the device name is a network identifier, the mobile access point identifies, according to the network identifier in the assistance command information, a network identifier (for example, a WiFi network) that should be used when the mobile access point provides a wireless service. Therefore, the network identifier used when the mobile access point provides the wireless service keeps consistent with a network identifier used by the access device that requires assistance, and a wireless traffic offload service can be provided for the access device.

When the mobile access point identifies, according to the assistance command information, that the device name is a service set identifier, the mobile access point identifies, according to the service set identifier in the assistance command information, a service set identifier (for example, CMCC) that should be used when the mobile access point provides a wireless service. Therefore, the service set identifier used when the mobile access point provides the wireless service keeps consistent with a service set identifier used by the access device that requires assistance, and a wireless traffic offload service can be provided for the access device.

The assistance request information sequence number is used to indicate the priority of the assistance request corresponding to the assistance response information. The mobile access point identifies, according to the assistance request information sequence number in the assistance command information, the priority of the assistance request corresponding to the assistance response information, and therefore can preferentially respond to an assistance request with a high priority according to priorities of assistance requests.

S1105. Transmit assistance status information to the network node, where the assistance status information includes one or a combination of a location parameter, a time parameter, or an event identifier.

When the mobile access point moves to the target location according to the assistance command information, the mobile access point transmits assistance status information to the network node, so that after the network node obtains the assistance status information in network status information, the network node can identify, according to a message identifier in the assistance status information, that the mobile access point has transmitted the assistance status information, and can estimate, according to the assistance status information, a remaining time required by the mobile access point to arrive at the location at which wireless assistance needs to be provided, and control, according to the required remaining time, the mobile access point to perform wireless assistance. The assistance status information is one or a combination of a location parameter, a time parameter, or an event identifier of the mobile access point that is performing wireless assistance.

The location parameter is used to indicate a current location of the mobile access point that is moving to the location of the access device that requires assistance, so that when the network node obtains the assistance status information in the network status information, the network node can determine, according to the location parameter in the assistance status information, the current location of the mobile access point or a difference from a location in an assistance status report that is transmitted previously, and therefore can determine, according to the location parameter, the remaining time required by the mobile access point to arrive at the target location to provide an assistance service.

The time parameter is used to indicate the remaining time required by the mobile access point to arrive at the target location to provide an assistance service, so that when the network node obtains the assistance status information in the network status information, the network node can determine, according to the time parameter in the assistance status information, the remaining time required by the mobile access point to arrive at the target location to provide the assistance service.

The event identifier is used to indicate an event that occurs when the mobile access point moves to the target location, for example, an event such as blocking of moving, changing of a moving path, or detection of a radio signal of the device that requires assistance, so that when the network node obtains the assistance status information in the network status information, the network node can determine, according to the event identifier in the assistance status information, the event that occurs during moving of the mobile access point to the target location, and therefore can determine, according to the event that occurs, the remaining time required by the mobile access point to arrive at the target location to provide the assistance service.

In the foregoing solution, a mobile access point receives a wireless assistance command transmitted by a network node, and moves, according to the wireless assistance command, to a location at which wireless assistance can be provided for an access device that requires assistance. Therefore, according to a wireless access service requirement of a user, the mobile access point that can provide wireless assistance is dynamically adjusted to move to the location at which wireless assistance can be provided for the access device that requires assistance, so as to provide a wireless traffic offload service, mitigate wireless access load of the access device that requires assistance, enhance network performance, and improve a wireless access service provided by a wireless network for the user.

The mobile access point transmits assistance status information to the network node when moving to the target location, so that the network node can estimate more accurately, according to an assistance status report transmitted by the mobile access point, a time required by the mobile access point to arrive at the location at which wireless assistance needs to be provided. Therefore, the mobile access point that can provide wireless assistance is dynamically adjusted to provide wireless assistance.

Figure 12:
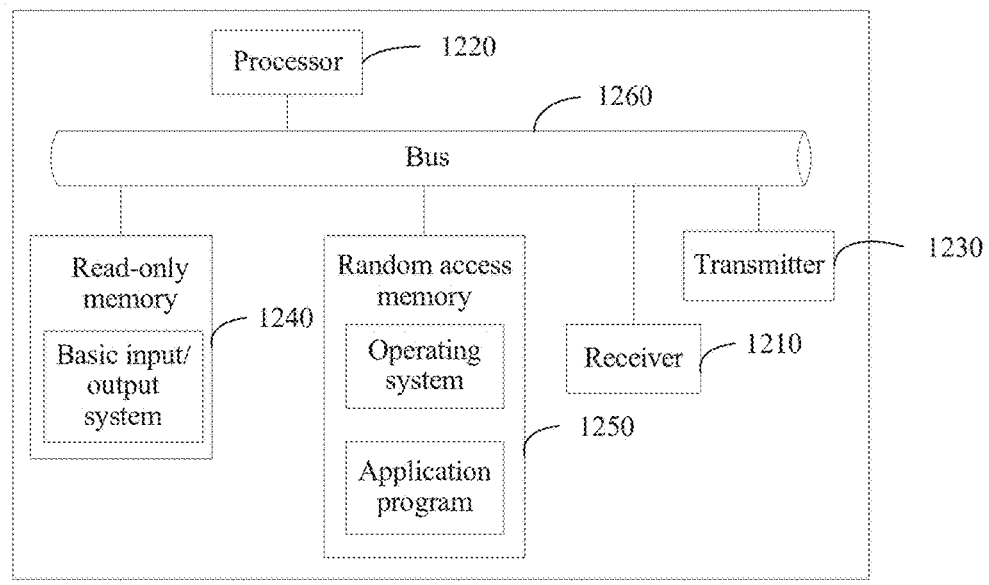
FIG. 12 is a schematic structural diagram of another implementation manner of a wireless assistance apparatus according to this application.

Referring to FIG. 12, FIG. 12 is a schematic structural diagram of another implementation manner of a wireless assistance apparatus according to this application. The wireless assistance apparatus in this implementation manner may be user equipment, an access device, or a control device, and includes a receiver 1210, a processor 1220, a transmitter 1230, a read-only memory 1240, a random access memory 1250, and a bus 1260.

The receiver 1210 is configured to receive data.

The processor 1220 controls an operation of a network node. The processor 1220 may also be referred to as a CPU (Central Processing Unit). The processor 1220 may be an integrated circuit chip, and has a signal processing capability. The processor 1220 may be a general purpose processor, a digital signal processor (DSP), an application-specific integrated circuit (ASIC), a field programmable gate array (FPGA) or any other programmable logic device, a discrete gate or a transistor logic device, or a discrete hardware component. The general purpose processor may be a microprocessor, or the processor may be any conventional processor or the like.

The transmitter 1230 is configured to transmit data.

The memory may include the read-only memory 1240 and the random access memory 1250, and provides an instruction and data for the processor 1220. A part of the memory may further include a non-volatile random access memory (NVRAM).

Components of the wireless assistance apparatus are coupled together by using the bus 1260, where in addition to a data bus, the bus 1260 may further include a power bus, a control bus, a status signal bus, and the like. However, for clear description, various buses are marked as the bus 1260 in the figure.

The memory stores the following elements, executable modules or data structures, or a subset thereof, or an extension set thereof: operation instructions, including various operation instructions, used to implement various operations; and an operating system, including various system programs, used to implement various basic services and process hardware-based tasks.

In the embodiment, the processor 1220 performs the following operations by invoking an operation instruction stored in the memory (the operation instruction may be stored in the operating system):

The processor 1220 is configured to obtain network status information, and determine, according to the network status information, a mobile access point that needs to perform wireless assistance.

The processor 1220 is configured to invoke the transmitter 1230 to transmit assistance command information to the mobile access point determined by the processor 1220, where the assistance command information is information for instructing the mobile access point to perform wireless assistance.

Optionally, the network status information is specifically one or a combination of the following: a user quantity, requested bandwidth, data traffic, or a service requirement.

Optionally, the network status information further includes assistance status information, where the assistance status information is one or a combination of a location parameter, a time parameter, or an event identifier of the mobile access point that is performing wireless assistance.

Optionally, the receiver 1210 is further included. The transmitter 1230 is further configured to transmit assistance request information to at least one mobile access point, where the assistance request information includes information about a location at which wireless assistance is required; the processor 1220 is further configured to invoke the receiver 1210 to receive assistance response information transmitted by the at least one mobile access point, where the assistance response information includes a mobile access point identifier, where the mobile access point identifier represents a mobile access point that can perform wireless assistance; and the processor 1220 is further configured to determine, according to the assistance response information received by the receiver 1210, from the at least one mobile access point, the mobile access point that needs to perform wireless assistance.

Optionally, the assistance response information further includes one or a combination of the following: a device capability parameter, an operating status parameter, a time parameter, an effectiveness parameter, or an assistance request information sequence number.

Optionally, the assistance request information further includes one or a combination of the following: a device capability parameter, a time parameter, an effectiveness parameter, or a device name.

Optionally, the assistance command information further includes one or a combination of the following: a mobile access point identifier, a device name, or an assistance request information sequence number.

Figure 13:
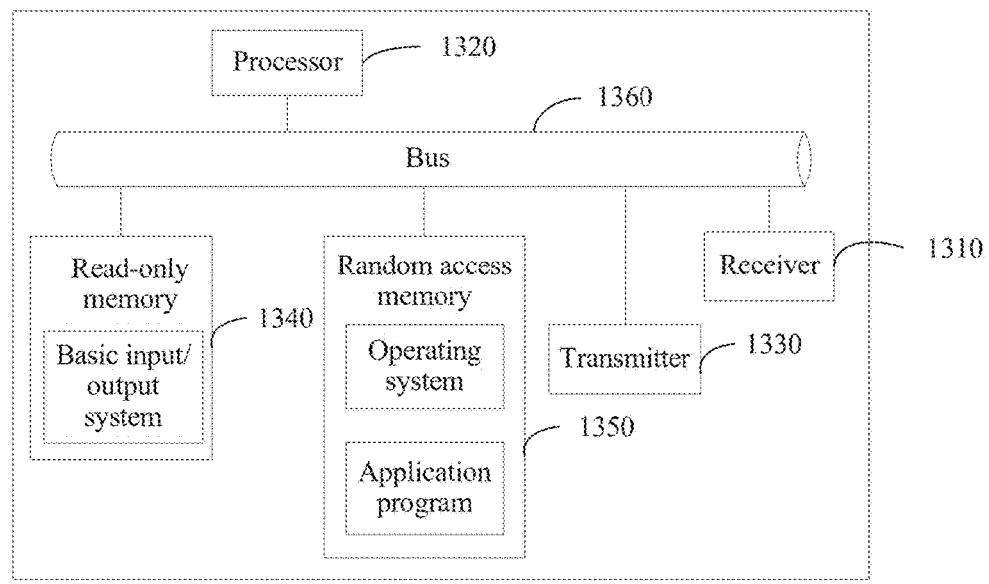
FIG. 13 is a schematic structural diagram of another implementation manner of a mobile access point according to this application.

Referring to FIG. 13, FIG. 13 is a schematic structural diagram of another implementation manner of a mobile access point according to this application. The mobile access point in this implementation manner may be a mobile robot, and includes a receiver 1310, a processor 1320, a transmitter 1330, a read-only memory 1340, a random access memory 1350, and a bus 1360.

The receiver 1310 is configured to receive data.

The processor 1320 controls an operation of the mobile access point. The processor 1320 may also be referred to as a CPU (Central Processing Unit, central processing unit). The processor 1320 may be an integrated circuit chip, and has a signal processing capability. The processor 1320 may be a general purpose processor, a digital signal processor (DSP), an application-specific integrated circuit (ASIC), a field programmable gate array (FPGA) or any other programmable logic device, a discrete gate or a transistor logic device, or a discrete hardware component. The general purpose processor may be a microprocessor, or the processor may be any conventional processor or the like.

The transmitter 1330 is configured to transmit data.

The memory may include the read-only memory 1340 and the random access memory 1350, and provides an instruction and data for the processor 1320. A part of the memory may further include a non-volatile random access memory (NVRAM).

Components of the mobile access point are coupled together by using the bus 1360, where in addition to a data bus, the bus 1360 may further include a power bus, a control bus, a status signal bus, and the like. However, for clear description, various buses are marked as the bus 1360 in the figure.

The memory stores the following elements, executable modules or data structures, or a subset thereof, or an extension set thereof: operation instructions, including various operation instructions, used to implement various operations; and an operating system, including various system programs, used to implement various basic services and process hardware-based tasks.

In the embodiment, the processor 1320 performs the following operations by invoking an operation instruction stored in the memory (the operation instruction may be stored in the operating system):

The processor 1320 is configured to invoke the receiver 1310 to receive assistance command information transmitted by a network node.

The processor 1320 is configured to perform wireless assistance according to the assistance command information received by the receiver 1310.

Optionally, the mobile access point further includes the transmitter 1330. The processor 1320 is further configured to invoke the transmitter 1330 to transmit assistance status information to the network node, where the assistance status information includes one or a combination of a location parameter, a time parameter, or an event identifier.

Optionally, the receiver 1310 is further configured receive assistance request information transmitted by the network node, where the assistance request information includes information about a location at which wireless assistance is required; the processor 1320 is further configured to determine, according to the assistance request information received by the receiver 1310, whether wireless assistance can be performed; and when wireless assistance can be performed, the transmitter 1330 is invoked to transmit assistance response information to the network node, where the assistance response information includes a mobile access point identifier.

Optionally, the assistance request information further includes one or a combination of the following: a device capability parameter, a time parameter, an effectiveness parameter, or a device name.

Optionally, the assistance response information further includes one or a combination of the following: a device capability parameter, an operating status parameter, a time parameter, an effectiveness parameter, or an assistance request information sequence number.

Optionally, the assistance command information further includes one or a combination of the following: a mobile access point identifier, a device name, or an assistance request information sequence number.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the implementation manners of this application. The foregoing storage medium includes: any medium that can store program code, such as a universal serial bus (USB) flash drive, a removable hard disk, a read-only memory (ROM), a random access memory (RAM), a magnetic disk, or an optical disc.

What is claimed is:

1. An apparatus, comprising:
   a processor; and
   a non-transitory computer readable storage medium storing a program for execution by the processor, the program including instructions to:
   obtain network status information;
   determine, according to the network status information, that an access device, which is in a network with the apparatus, is in need of wireless assistance;
   after determining that the access device is in need of wireless assistance, determine a mobile access point to perform a wireless assistance process on the access device;
   determine assistance command information that will instruct the mobile access point to perform the wireless assistance process by instructing the mobile access point to move to the access device and to provide a wireless traffic offload service for the access device; and
   transmit the assistance command information to the mobile access point to instruct the mobile access point to perform the wireless assistance process.

2. The apparatus according to claim 1, wherein the network status information comprises information selected from the group consisting of a user quantity, requested bandwidth, data traffic, and a service requirement.

3. The apparatus according to claim 1, wherein the network status information further comprises assistance status information, and wherein the assistance status information comprises information selected from the group consisting of a location parameter, a time parameter, and an event identifier of the mobile access point that is performing wireless assistance.

4. The apparatus according to claim 1, wherein the instructions further comprise instructions to:
   transmit assistance request information to at least one mobile access point, wherein the assistance request information comprises information about a location at which wireless assistance is requested;
   receive assistance response information transmitted by the at least one mobile access point, wherein the assistance response information comprises a mobile access point identifier, and wherein the mobile access point identifier represents a mobile access point that can perform wireless assistance; and
   determine, according to the assistance response information, a selected mobile access point for performing wireless assistance.

5. The apparatus according to claim 4, wherein the assistance response information further comprises information selected from the group consisting of a device capability parameter, an operating status parameter, a time parameter, an effectiveness parameter, and an assistance request information sequence number.

6. The apparatus according to claim 4, wherein the assistance request information further comprises information selected from the group consisting of a device capability parameter, a time parameter, an effectiveness parameter, and a device name.

7. The apparatus according to claim 4, wherein the assistance command information further comprises information selected from the group consisting of a mobile access point identifier, a device name, and an assistance request information sequence number.

8. A mobile access point, comprising:
   a processor; and
   a non-transitory computer readable storage medium storing a program for execution by the processor, the program including instructions to:
   receive assistance command information transmitted by a network node when it is determined, according to network status information, that an access device, which is in a network with the mobile access point, is in need of wireless assistance, and that the mobile access point will perform a wireless assistance process on the access device, wherein the assistance command information comprises instructions for the mobile access point to perform the wireless assistance process; and
   perform the wireless assistance process according to the assistance command information;
   wherein the instructions to perform the wireless assistance process comprise instructions to:
   move to the access device that is in need of wireless assistance; and
   provide a wireless traffic offload service for the access device.

9. The mobile access point according to claim 8, wherein the instructions further comprise instructions to transmit assistance status information to the network node, wherein the assistance status information comprises information selected from the group consisting of a location parameter, a time parameter, and an event identifier.

10. The mobile access point according to claim 8, wherein the instructions further comprise instructions to:
    receive assistance request information transmitted by the network node, wherein the assistance request information comprises information about a location at which wireless assistance is requested;
    determine, according to the assistance request information, whether wireless assistance can be performed; and
    transmit assistance response information to the network node, in response to determining that wireless assistance can be performed, wherein the assistance response information comprises a mobile access point identifier.

11. The mobile access point according to claim 10, wherein the assistance request information further comprises information selected from the group consisting of a device capability parameter, a time parameter, an effectiveness parameter, and a device name.

12. The mobile access point according to claim 10, wherein the assistance response information further comprises information selected from the group consisting of a device capability parameter, an operating status parameter, a time parameter, an effectiveness parameter, and an assistance request information sequence number.

13. The mobile access point according to claim 10, wherein the assistance command information further comprises information selected from the group consisting of a mobile access point identifier, a device name, and an assistance request information sequence number.

14. A method, comprising:
    obtaining, by a user equipment, network status information;
    determining, by the user equipment, according to the network status information, that an access device, which is in a network as the user equipment, is in need of wireless assistance;

after determining that the access device in the network is in need of wireless assistance, determining, by the user equipment, a mobile access point to perform a wireless assistance process on the access device; and transmitting assistance command information to the mobile access point, wherein the assistance command information comprises instructions for the mobile access point to perform the wireless assistance process, wherein the instructions comprise instructions for the mobile access point to move to the access device, and to provide a wireless traffic offload service for the access device.

15. The method according to claim 14, wherein the network status information comprises information selected from the group consisting of a user quantity, requested bandwidth, data traffic, and a service requirement.

16. The method according to claim 14, wherein the network status information further comprises assistance status information, wherein the assistance status information comprises information selected from the group consisting of a location parameter, a time parameter, and an event identifier of the mobile access point that performs wireless assistance.

17. The method according to claim 14, wherein determining, according to the network status information, the mobile access point for performing wireless assistance, comprises:

transmitting assistance request information to at least one mobile access point, wherein the assistance request information comprises information about a location at which wireless assistance is requested;

receiving assistance response information transmitted by the at least one mobile access point, wherein the assistance response information comprises a mobile access point identifier, and wherein the mobile access point identifier represents a mobile access point that can perform wireless assistance; and determining, according to the assistance response information, a selected mobile access point to perform wireless assistance.

18. A method, comprising:

receiving, by a mobile access point, assistance command information transmitted by a network node when it is determined, according to network status information, that an access device, which is in a network with the mobile access point, is in need of wireless assistance, and that the mobile access point will perform a wireless assistance process on the access device, wherein the assistance command information comprises instructions for the mobile access point to perform the wireless assistance process; and performing, by the mobile access point, the wireless assistance process according to the assistance command information, by moving to the access device that is in need of wireless assistance, and providing a wireless traffic offload service for the access device.

19. The method according to claim 18, further comprising:

transmitting assistance status information to the network node, while performing wireless assistance, wherein the assistance status information comprises at least one of a location parameter, a time parameter, and an event identifier.

20. The method according to claim 18, further comprising:

receiving assistance request information transmitted by the network node, before receiving the assistance command information transmitted by the network node, wherein the assistance request information comprises information about a location at which wireless assistance is required;

determining, according to the assistance request information, whether wireless assistance can be performed; and transmitting assistance response information to the network node, in response to determining that wireless assistance can be performed, wherein the assistance response information comprises a mobile access point identifier.

* * * * *